(12) United States Patent
Park et al.

(10) Patent No.: US 9,796,281 B2
(45) Date of Patent: Oct. 24, 2017

(54) WIRELESS POWER TRANSMISSION METHOD AND APPARATUS FOR STABLY TRANSMITTING POWER TO PLURALITY OF WIRELESS POWER RECEPTION APPARATUSES

(71) Applicant: Samsung Electronics Co., Ltd., Suwon-si (KR)

(72) Inventors: Jae Hyun Park, Yongin-si (KR); Young Ho Ryu, Yongin-si (KR); Sang Wook Kwon, Seongnam-si (KR); Ki Young Kim, Yongin-si (KR); Nam Yun Kim, Seoul (KR); Dong Zo Kim, Yongin-si (KR); Bong Chul Kim, Seoul (KR); Yun Kwon Park, Dongducheon-si (KR); Keum Su Song, Seoul (KR); Chi Hyung Ahn, Suwon-si (KR); Byoung Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 14/323,132

(22) Filed: Jul. 3, 2014

(65) Prior Publication Data

US 2015/0042169 A1 Feb. 12, 2015

(30) Foreign Application Priority Data

Aug. 7, 2013 (KR) .................. 10-2013-0093689

(51) Int. Cl.
*B60L 11/18* (2006.01)
*H02J 7/02* (2016.01)
(Continued)

(52) U.S. Cl.
CPC ......... *B60L 11/182* (2013.01); *B60L 11/1824* (2013.01); *B60L 11/1861* (2013.01); *H02J 7/025* (2013.01); *H04B 5/0037* (2013.01); *B60L 2210/10* (2013.01); *B60L 2210/30* (2013.01); *B60L 2210/40* (2013.01); *B60L 2230/16* (2013.01); *H02J 17/00* (2013.01); *Y02T 10/7005* (2013.01); *Y02T 10/705* (2013.01); *Y02T 10/7044* (2013.01); *Y02T 10/7088* (2013.01);
(Continued)

(58) Field of Classification Search
CPC ........ H02J 17/00; H02J 17/0025; H02J 7/025; H02J 9/00; B60L 11/182; B60L 11/1861; B06L 13/04; H01F 38/14; H04B 5/0037
USPC .................................................. 307/104, 108
See application file for complete search history.

(56) References Cited

U.S. PATENT DOCUMENTS 8,994,216 B2 * 3/2015 Sato .................. H02J 9/062
307/66
9,525,302 B2 * 12/2016 Throngnumchai ... B60L 11/182
(Continued)

FOREIGN PATENT DOCUMENTS

JP 2012-205411 A 10/2012

*Primary Examiner* — Adi Amrany
*Assistant Examiner* — Win Htun
(74) *Attorney, Agent, or Firm* — NSIP Law

(57) ABSTRACT

A wireless power transmission apparatus includes a plurality of transmission (TX) resonators configured to resonate with at least one reception (RX) resonator, and wirelessly transmit power to the at least one RX resonator; and a frequency controller configured to control the input frequency so that power is stably supplied to the at least one RX resonator.

23 Claims, 22 Drawing Sheets

(51) Int. Cl.
*H04B 5/00* (2006.01)
*H02J 17/00* (2006.01)

(52) U.S. Cl.
CPC ........ *Y02T 10/7216* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01)

(56) References Cited

U.S. PATENT DOCUMENTS

| | | | | |
|---|---|---|---|---|
| 2007/0232249 | A1* | 10/2007 | Kwon | H04B 1/0458 455/121 |
| 2007/0296393 | A1* | 12/2007 | Malpas | A61B 5/0002 323/355 |
| 2009/0322444 | A1* | 12/2009 | Tanaka | H03H 9/0085 333/132 |
| 2011/0109167 | A1* | 5/2011 | Park | H02J 17/00 307/104 |
| 2012/0049642 | A1* | 3/2012 | Kim | H02J 5/005 307/104 |
| 2012/0049643 | A1* | 3/2012 | Ryu | H03H 7/40 307/104 |
| 2012/0056485 | A1* | 3/2012 | Haruyama | H02J 5/005 307/104 |
| 2012/0062173 | A1* | 3/2012 | Choi | H02J 5/005 320/108 |
| 2012/0080957 | A1* | 4/2012 | Cooper | H02J 5/005 307/104 |
| 2012/0248889 | A1* | 10/2012 | Fukushi | H02J 17/00 307/104 |

\* cited by examiner

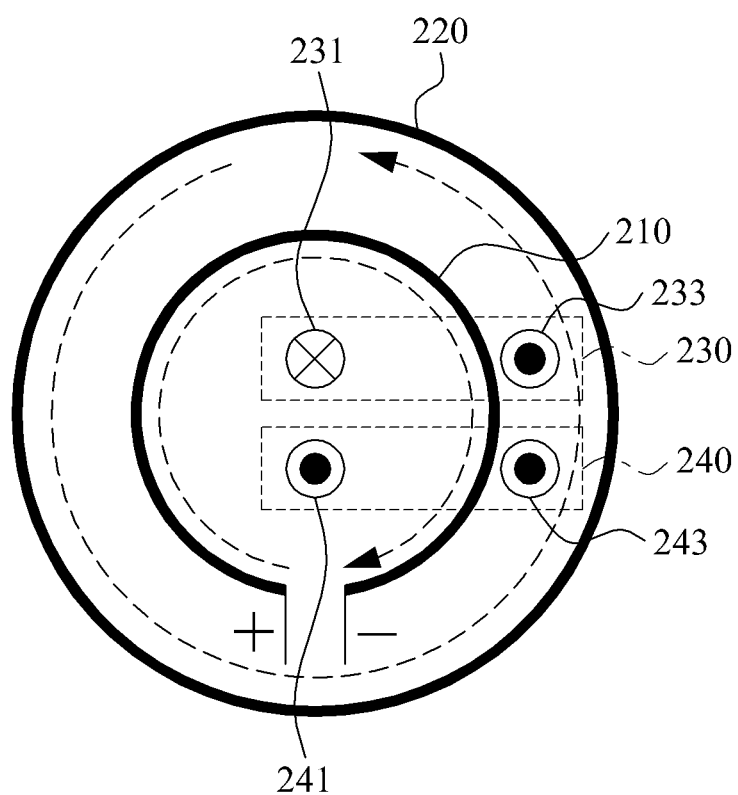

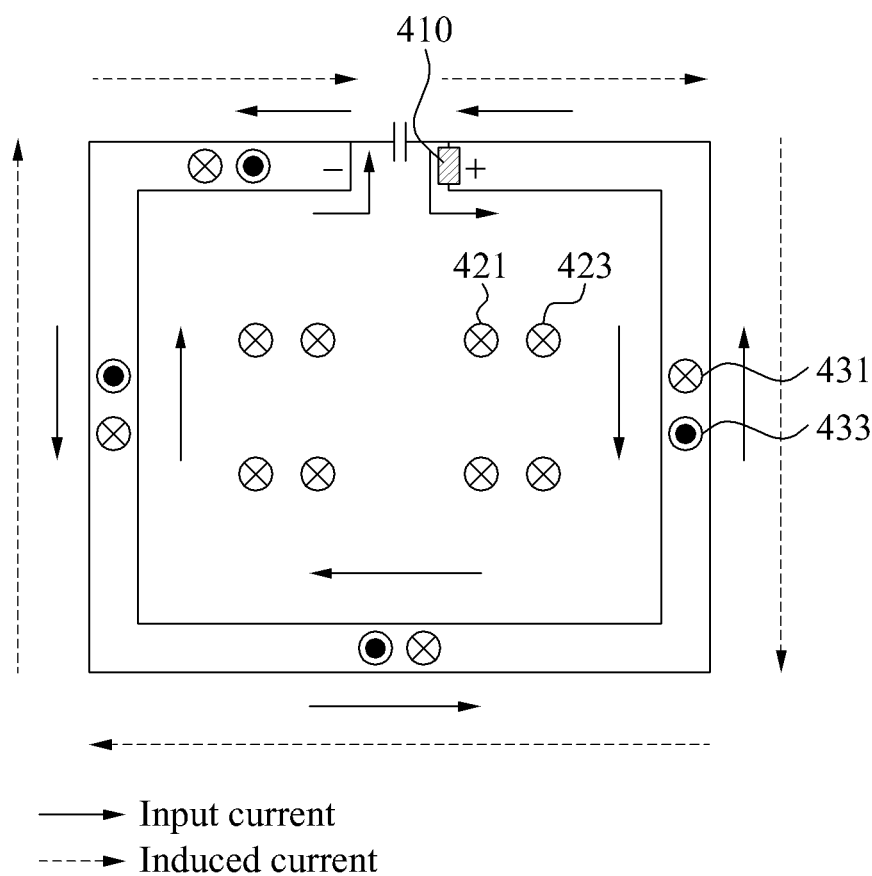

WIRELESS POWER TRANSMISSION METHOD AND APPARATUS FOR STABLY TRANSMITTING POWER TO PLURALITY OF WIRELESS POWER RECEPTION APPARATUSES

CROSS-REFERENCE TO RELATED APPLICATIONS

This application claims the benefit under 35 USC 119(a) of Korean Patent Application No. 10-2013-0093689 filed on Aug. 7, 2013, in the Korean Intellectual Property Office, the entire disclosure of which is incorporated herein by reference for all purposes.

BACKGROUND

1. Field

The following description relates to a wireless power transmission system.

2. Description of Related Art

Wireless power refers to energy that is transmitted from a wireless power transmission apparatus to a wireless power reception apparatus via a magnetic coupling. Accordingly, a wireless power charging system includes a source device configured to wirelessly transmit power, and a target device configured to wirelessly receive power. The source device may be referred to as a wireless power transmission apparatus, and the target device may be referred to as a wireless power reception apparatus.

The source device may include a source resonator, and the target device may include a target resonator. Magnetic coupling or resonant coupling may be formed between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission apparatus includes a plurality of transmission (TX) resonators configured to resonate with at least one reception (RX) resonator at an input frequency, and wirelessly transmit power to the at least one RX resonator; and a frequency controller configured to control the input frequency so that power is stably supplied to the at least one RX resonator.

The frequency controller may be further configured to control the input frequency so that wireless power transmission information received from a wireless power reception apparatus including the at least one RX resonator is equal to or greater than a predetermined threshold.

The wireless power transmission information may include information associated with any one or any combination of a current, a voltage, and a power of the at least one RX resonator.

The frequency controller may be further configured to control the input frequency so that a wireless power transmission efficiency calculated based on wireless power transmission information received from a wireless power reception apparatus including the at least one RX resonator is equal to or greater than a predetermined efficiency.

The wireless power transmission efficiency may include any one or any combination of a current ratio, a voltage ratio, and a power ratio of the at least one RX resonator with respect to the plurality of TX resonators.

The frequency controller may be further configured to control the input frequency to increase a wireless power transmission efficiency of an RX resonator having a coupling coefficient lower than a predetermined coefficient among the at least one RX resonator.

The frequency controller may be further configured to control the input frequency so that a wireless power transmission efficiency of each of the at least one RX resonator is equal to or greater than a predetermined efficiency.

In another general aspect, a wireless power transmission apparatus includes a multi-resonator including a plurality of transmission (TX) resonators, the plurality of TX resonators being designed to have resonant frequencies matched to a resonant frequency of a reception (RX) resonator; and a feeder configured to supply power to each of the plurality of TX resonators of the multi-resonator.

The feeder may be further configured to supply the power to each of the plurality of TX resonators so that power having a same input frequency is supplied to each of the plurality of TX resonators; and the plurality of TX resonators may be designed so that the resonant frequencies are matched to the resonant frequency of the RX resonator during mutual resonance between the plurality of TX resonators and the RX resonator.

The feeder may be further configured to supply the power to the multi-resonator through an inductive coupling between the feeder and each of the plurality of TX resonators.

The plurality of TX resonators may be connected in parallel with each other; and the feeder may be connected in series with the multi-resonator.

The plurality of TX resonators may connected in series with each other; and the feeder may be connected in parallel with the multi-resonator.

The plurality of TX resonators may be arranged in a two-dimensional pattern.

In another general aspect, a wireless power transmission method includes tracking an input frequency at which power is stably supplied from a plurality of transmission (TX) resonators to at least one reception (RX) resonator; and wirelessly transmitting power to the at least one RX resonator at the tracked input frequency.

The tracking may include tracking an input frequency that enables wireless power transmission information received from a wireless power reception apparatus including the at least one RX resonator to be equal to or greater than a predetermined threshold.

The tracking may include tracking the input frequency based on information associated with any one or any combination of a current, a voltage, and a power of the at least one RX resonator.

The tracking may include calculating a wireless power transmission efficiency based on wireless power transmission information received from a wireless power reception apparatus including the at least one RX resonator; and tracking the input frequency based on the calculated wireless power transmission efficiency.

The tracking of the input frequency based on the calculated wireless power transmission efficiency may include tracking the input frequency based on any one or any combination of a current ratio, a voltage ratio, and a power ratio of the at least one RX resonator with respect to the plurality of TX resonators.

The tracking may include tracking an input frequency that enables an increase in a wireless power transmission efficiency of an RX resonator having a coupling coefficient that is lower than a predetermined coefficient among the at least one RX resonator.

The tracking may include tracking an input frequency that enables a wireless power transmission efficiency of each of the at least one RX resonator to be equal to or greater than a predetermined efficiency.

In another general aspect, a wireless power transmission apparatus includes a plurality of transmission (TX) resonators configured to resonate with at least one reception (RX) resonator, and wirelessly transmit power to the at least one RX resonator; and a single matching network configured to match the plurality of TX resonators to the at least one RX resonator to increase a wireless power transmission efficiency of wirelessly transmitting the power to the at least one RX resonator.

The wireless power transmission apparatus may further include a single feeder configured to supply power to each of the plurality of TX resonators.

The wireless power transmission apparatus may further include a frequency controller configured to control a frequency at which the single feeder supplies power to each of the plurality of TX resonators.

Other features and aspects will be apparent from the following detailed description, the drawings, and the claims.

BRIEF DESCRIPTION OF THE DRAWINGS

FIGS. 2A and 2B illustrate examples of a distribution of a magnetic field in a feeder and a resonator.

FIG. 4A illustrates an example of a distribution of a magnetic field inside a resonator produced by feeding a feeder.

DETAILED DESCRIPTION

Figure 1:
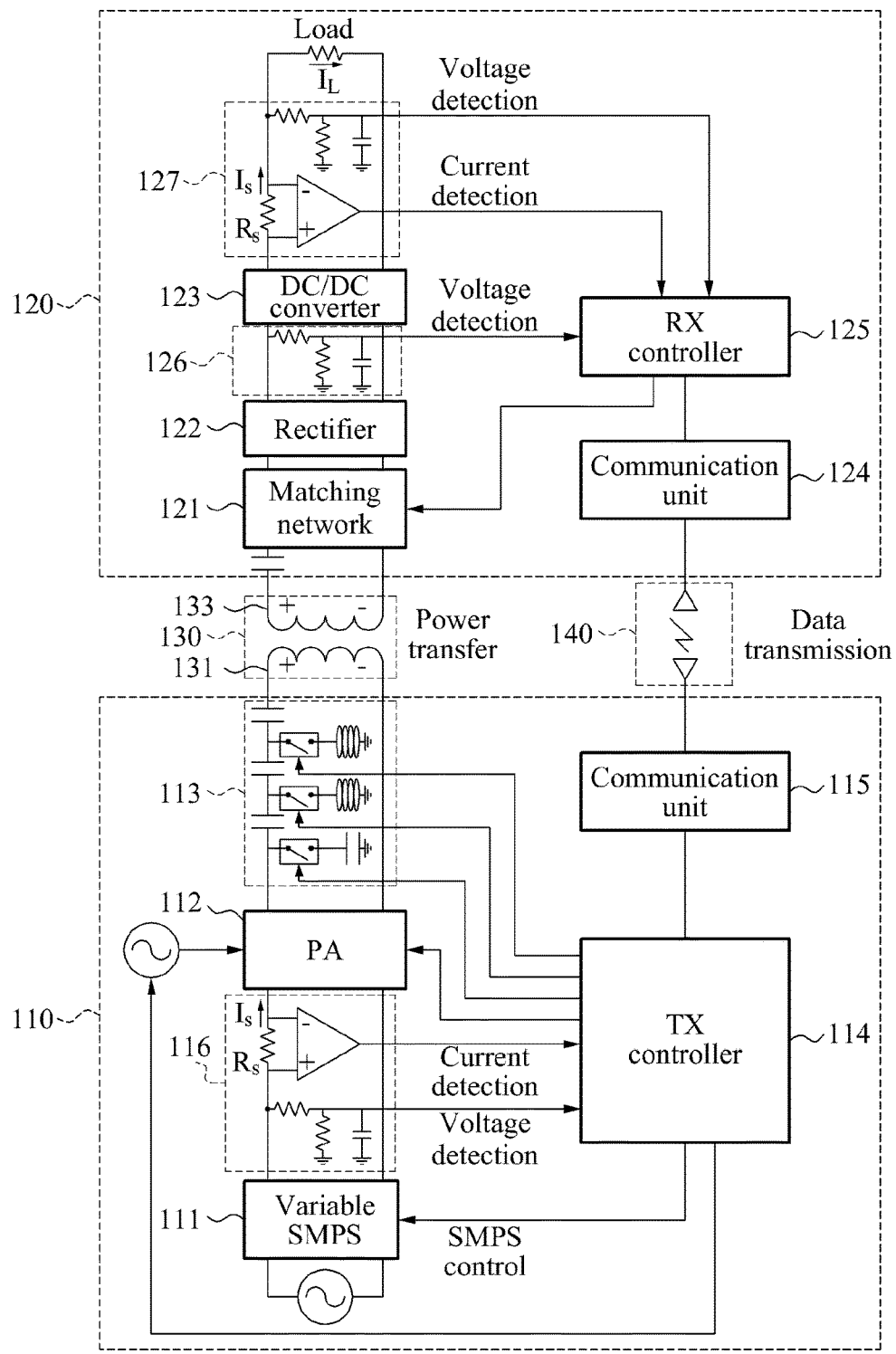
FIG. 1 illustrates an example of a wireless power transmission and reception system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Schemes of performing communication between a source and a target include an in-band communication scheme and an out-of-band communication scheme. In the in-band communication scheme, the source and the target communicate with each other using the same frequency band that is used for power transmission. In the out-of-band communication scheme, the source and the target communicate with each other using a frequency band that is different from a frequency band that is used for power transmission.

FIG. 1 illustrates an example of a wireless power transmission and reception system.

Referring to FIG. 1, the wireless power transmission system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a terminal, a tablet PC, a TV, a medical device, an electric vehicle, a washing machine, a radio, or a lighting system.

The source 110 includes a variable switching mode power supply (SMPS) 111, a power amplifier (PA) 112, a matching network 113, a transmission (TX) controller 114 (for example, TX control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under the control of the TX controller 114.

The power detector 116 detects an output current and an output voltage of the variable SMPS 111, and outputs, to the TX controller 114, information on the detected output current and the detected output voltage. Additionally, the power detector 116 may detect an input current and an input voltage of the PA 112.

The PA 112 generates power by converting a DC voltage having a predetermined level supplied to the PA 112 by the variable SMPS 111 to an AC voltage using a switching pulse signal having a frequency in a band of a few megahertz (MHz) to tens of MHz. For example, the PA 112 may convert a DC voltage supplied to the PA 112 to an AC voltage having a reference resonant frequency $F_{Ref}$, and may generate communication power used for communication, or charging power used for charging. The communication power and the charging power may be used in a plurality of targets.

As used herein, the term "communication power" refers to a low power of 0.1 milliwatt (mW) to 1 mW, and the term "charging power" refers to a high power of 1 mW to tens of kilowatts (kW) consumed by a load of a target. However, these are merely examples, and the communication power and the charging power may have other ranges. As used herein, the term "charging" refers to supplying power to a unit or element that is configured to charge a battery or other rechargeable device. Additionally, the term "charging" refers to supplying power to a unit or element configured to consume power. For example, the term "charging power" may refer to power consumed by a target while operating, or power used to charge a battery of the target. The unit or element may be, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The TX controller 114 may detect a reflected wave of the communication power or the charging power, and may detect mismatching that occurs between a target resonator 133 and a source resonator 131 based on the detected reflected wave. To detect the mismatching, for example, the TX controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the TX controller 114. The matching network 113 includes at least one inductor and at least one capacitor each connected to a respective switch controlled by the TX controller 114.

The TX controller 114 may calculate a voltage standing wave ratio (VSWR) based on a voltage level of the reflected wave and a level of an output voltage of the source resonator 131 or the PA 112. For example, if the VSWR is greater than a predetermined value, the TX controller 114 may determine that a mismatch is detected between the source resonator 131 and the target resonator 133.

In another example, if the VSWR is greater than the predetermined value, the TX controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The TX controller 114 may adjust a frequency of the switching pulse signal used by the PA 112. The frequency of the switching pulse signal may be determined under the control of the TX controller 114. For example, by controlling the PA 112, the TX controller 114 may generate a modulated signal to be transmitted to the target 120. In other words, the TX controller may transmit a variety of data to the target 120 using in-band communication. The TX controller 114 may also detect a reflected wave, and may demodulate a signal received from the target 120 from an envelope of the detected reflected wave.

The TX controller 114 may generate a modulated signal for in-band communication using various methods. For example, the TX controller 114 may generate the modulated signal by turning on and off a switching pulse signal, by performing delta-sigma modulation, or by any other modulation method known to one of ordinary skill in the art.

Additionally, the TX controller 114 may generate a pulse-width modulated (PWM) signal having a predetermined envelope.

The communication unit 115 may perform out-of-band communication using a separate communication channel. The communication unit 115 may include a communication module, such as a ZigBee module, a Bluetooth module, or any other communication module known to one of ordinary skill in the art the communication unit 115 may use to transmit and receive data 140 to and from the target 120 using the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

As illustrated in FIG. 1, the target 120 includes a matching network 121, a rectifier 122, a DC-to-DC (DC/DC) converter 123, a communication unit 124, a reception (RX) controller 125 (for example, RX control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive data from the source 110 using the in-band communication.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. Additionally, the detected current and the detected voltage of the output terminal may be used by the RX controller 125 to calculate an amount of power actually transferred to the load. The TX controller 114 of the source 110 may calculate an amount of power that needs to be transmitted by the source 110 to the target 120 based on an amount of power required by the load and the amount of power actually transferred to the load.

If the amount of power actually transferred to the load calculated by the RX controller 125 is transmitted to the source 110 by the communication unit 124, the TX controller 114 may calculate an amount of power that needs to be transmitted to the target 120, and may control either one or both of the variable SMPS 111 and the PA 112 to generate an amount of power that will enable the calculated amount of power to be transmitted by the source 110.

The communication unit 124 may perform in-band communication to transmit and receive data to and from the source 110 using a resonant frequency. During the in-band communication, the RX controller 125 may demodulate a received signal by detecting a signal between the target resonator 133 and the rectifier 122, or detecting an output signal of the rectifier 122. In particular, the RX controller 125 may demodulate a message received using the in-band communication.

Additionally, the RX controller 125 may adjust an input impedance of the target resonator 133 using the matching network 121 to modulate a signal to be transmitted to the source 110. For example, the RX controller 125 may adjust the matching network 121 to increase the impedance of the target resonator 133 so that a reflected wave will be detected by the TX controller 114 of the source 110. Depending on whether the reflected wave is detected, the TX controller 114 may detect a first value, for example, a binary number "0", or a second value, for example, a binary number "1." For example, when the reflected wave is detected, the TX controller 114 may detect "0", and when the reflected wave is not detected, the TX controller 114 may detect "1". Alternatively, when the reflected wave is detected, the TX controller 114 may detect "1", and when the reflected wave is not detected, the TX controller 114 may detect "0".

The communication unit 124 of the target 120 may transmit a response message to the communication unit 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120. A type of information included in the response message may be changed depending on the particular implementation.

The communication unit 124 may perform out-of-band communication using a separate communication channel. For example, the communication unit 124 may include a communication module, such as a ZigBee module, a Bluetooth module, or any other communication module known to one of ordinary skill in the art that the communication unit 124 may use to transmit and receive the data 140 to and from the source 110 using the out-of-band communication.

The communication unit 124 may receive a wake-up request message from the source 110, and the power detector 127 may detect an amount of power received by the target resonator 133. The communication unit 124 may transmit, to the source 110, information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The TX controller 114 may set a resonance bandwidth of the source resonator 131. Based on the setting of the resonance bandwidth of the source resonator 131, a Q-factor $Q_S$ of the source resonator 131 may be determined. For example, the TX controller 114 may set the resonance bandwidth of the source resonator 131 to be wider or narrower than the resonance bandwidth of the target resonator 133.

Additionally, the RX controller 125 may set a resonance bandwidth of the target resonator 133. Based on the setting of the resonance bandwidth of the target resonator 133, a Q-factor $Q_D$ of the target resonator 133 may be determined. For example, the RX controller 125 may set the resonance bandwidth of the target resonator 133 to be wider or narrower than the resonance bandwidth of the source resonator 131.

The source 110 and the target 120 may communicate with each other to share information about the resonance bandwidth of the source resonator 131 and the resonance bandwidth of the target resonator 133. In an example in which power desired or required by the target 120 is higher than a reference value, the Q-factor $Q_S$ of the source resonator 131 may be set to a value greater than 100. In another example in which the power desired or required by the target 120 is lower than the reference value, the Q-factor $Q_S$ of the source resonator 131 may be set to a value less than 100.

In a wireless power transmission employing a resonance scheme, the resonance bandwidth may be an important factor. A Q-factor Qt of energy coupling between the source resonator 131 and the target resonator 133 is affected by a change in a distance between the source resonator 131 and the target resonator 133, a change in the resonance impedance, impedance mismatching, a reflected signal, or a change in any other factor affecting a Q-factor. Qt is inversely proportional to the resonance bandwidth as expressed by the following Equation 1.

$$\frac{\Delta f}{f_0} = \frac{1}{Qt} \qquad (1)$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between the source resonator 131 and the target resonator 133, $BW_S$ denotes a resonance bandwidth of the source resonator 131, and $BW_D$ denotes a resonance bandwidth of the target resonator 133.

An wireless power transmission efficiency U of the wireless power transmission may be expressed by the following Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad (2)$$

In Equation 2, κ denotes a coupling coefficient of energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonant frequency of the source resonator 131 and the target resonator 133, M denotes a mutual inductance between the source resonator 131 and the target resonator 133, $R_S$ denotes an impedance of the source resonator 131, $R_D$ denotes an impedance of the target resonator 133, $Q_S$ denotes the Q-factor of the source resonator 131, $Q_D$ denotes the Q-factor of the target resonator 133, and $Q_\kappa$ denotes a Q-factor of the energy coupling between the source resonator 131 and the target resonator 133, and is the same as Qt discussed above in connection with Equation 1.

As can be seen from Equation 2, the Q-factors $Q_S$ and $Q_D$ have a great effect on the wireless power transmission efficiency U.

Accordingly, to increase the wireless power transmission efficiency U, the Q-factors $Q_S$ and $Q_D$ may be set to high values. However, even when the Q-factors $Q_S$ and $Q_D$ are set to extremely high values, the wireless power transmission efficiency U may be reduced due to a change in the coupling coefficient κ of energy coupling, a change in the distance between the source resonator 131 and the target resonator 133, a change in the resonance impedance, impedance mismatching, or a change in any other factor affecting the wireless power transmission efficiency U.

If the resonance bandwidths $BW_S$ and $BW_D$ of the source resonator 131 and the target resonator 133 are set to be very narrow to increase the wireless power transmission efficiency U, impedance mismatching between the source resonator 131 and the target resonator 133 may easily occur due to even a small external influence. In terms of impedance mismatching, Equation 1 may be rewritten as the following Equation 3.

$$\frac{\Delta f}{f_0} = \frac{\sqrt{VSWR} - 1}{Q_t \sqrt{VSWR}} \quad (3)$$

In an example in which an unbalanced relationship of a resonance bandwidth or a bandwidth of an impedance matching frequency between the source resonator 131 and the target resonator 133 is maintained, a decrease in the wireless power transmission efficiency U may be prevented. The decrease in the wireless power transmission efficiency U may be a result of a change in the coupling coefficient κ of energy coupling, a change in the distance between the source resonator 131 and the target resonator 133, a change in the resonance impedance, impedance mismatching, or any other factor affecting the wireless power transmission efficiency U.

Based on Equations 1 and 3, an unbalanced relationship between the Q-factors $Q_S$ and $Q_D$ may be maintained in an example in which the unbalanced relationship of the resonance bandwidth or the bandwidth of the impedance matching frequency between the source resonator 131 and the target resonator 133 is maintained.

In FIG. 1, the source 110 may wirelessly transmit a wake-up power used to wake up the target 120, and may broadcast a configuration signal used to configure a wireless power transmission network. The source 110 may receive, from the target 120, a search frame including a value of reception sensitivity of the configuration signal in the target 120, allow the target 120 to join the wireless power transmission network, and transmit, to the target 120, an ID identifying the target 120 in the wireless power transmission network. Additionally, the source 110 may generate charging power through power control, and wirelessly transmit the charging power to the target 120.

Additionally, the target 120 may receive a wake-up power from at least one of a plurality of sources, and activate a communication function using the wake-up power. The target 120 may receive a configuration signal to configure a wireless power transmission network from each of the plurality of sources, select one of the plurality of sources, such as the source 110 in FIG. 1, based on a reception sensitivity of the configuration signal in the target 120, and wirelessly receive power from the selected source 110.

In the following description of FIGS. 2A, 2B, 3A, 3B, 4A, and 4B, unless otherwise indicated, the term "resonator" may refer to both a source resonator and a target resonator.

Figure 2B:
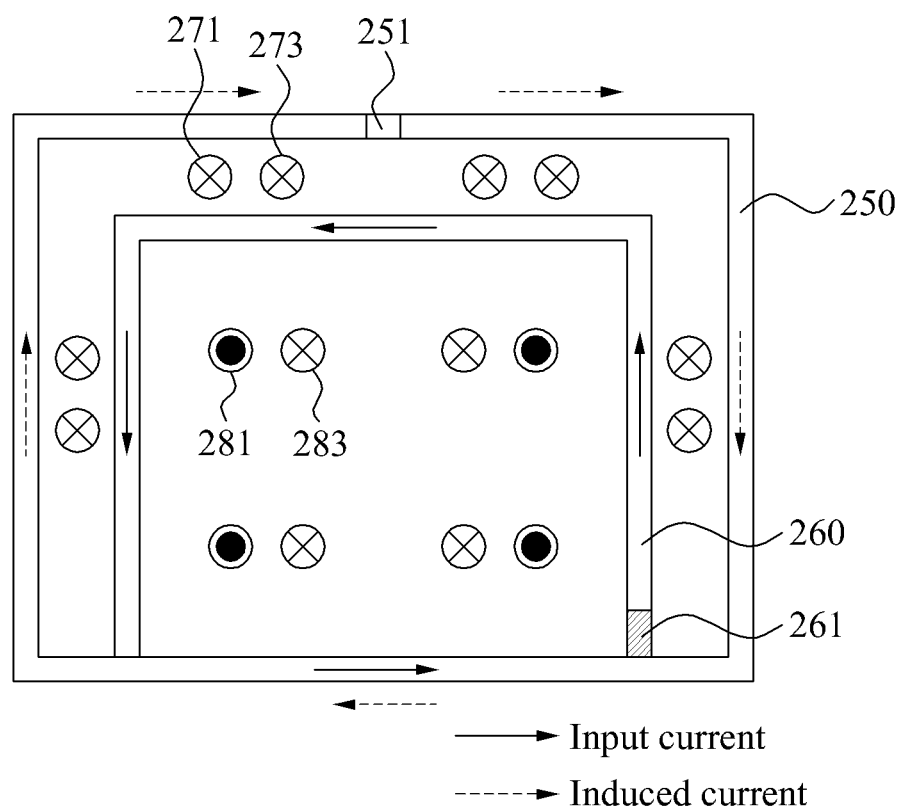

FIGS. 2A and 2B illustrate examples of a distribution of a magnetic field in a feeder and a resonator.

When a resonator receives power supplied through a separate feeder, magnetic fields are generated in both the feeder and the resonator.

A source resonator and a target resonator may each have a dual loop structure including an external loop and an internal loop.

FIG. 2A is a diagram illustrating an example of a structure of a wireless power transmitted in which a feeder 210 and a resonator 220 do not have a common ground.

Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A and is opposite to a direction 233 of the magnetic field 230 outside the feeder 210. The magnetic field 230 generated by the feeder 210 induces a current in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. Accordingly, when power is supplied to the resonator 220 through the feeder 210 configured as illustrated in FIG. 2A, the strength of the total magnetic field decreases in the portion of the resonator 220 inside the feeder 210, but increases in the portion of the resonator 220 outside the feeder 210. When a distribution of a magnetic field is random or not uniform in the resonator 220, it may be difficult to perform impedance matching because an input impedance may frequently vary. Additionally, when the strength of the total magnetic field is increased, a wireless power transmission efficiency increases. Conversely, when the strength of the total magnetic field decreases, the wireless power transmission efficiency decreases. Accordingly, the wireless power transmission efficiency may be reduced on average.

FIG. 2B illustrates an example of a structure of a wireless power transmission apparatus in which a source resonator 250 and a feeder 260 have a common ground. The source resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, to be formed, and a current is induced in the source resonator 250 by the magnetic field. Additionally, another magnetic field is generated by the induced current flowing in the source resonator 250. In this example, a direction of the input current flowing in the feeder 260 is opposite to a direction of the induced current flowing in the source resonator 250. Accordingly, in a region between the source resonator 250 and the feeder 260, a direction 271 of the magnetic field generated by the input current is the same as a direction 273 of the magnetic field generated by the induced current, and thus the strength of the total magnetic field increases in this region. Conversely, inside the feeder 260, a direction 281 of the magnetic field generated by the input current is opposite to a direction 283 of the magnetic field generated by the induced current, and thus the strength of the total magnetic field decreases in this region. Therefore, the strength of the total magnetic field decreases in a portion of the source resonator 250 inside the feeder 260, but in a portion of the source resonator 250 outside the feeder 260.

An input impedance may be adjusted by adjusting an internal area of the feeder 260. The input impedance is an impedance viewed in a direction from the feeder 260 to the source resonator 250. When the internal area of the feeder 260 increases, the input impedance increases. Conversely, when the internal area of the feeder 260 decreases, the input impedance decreases. However, if the magnetic field is randomly or not uniformly distributed in the source resonator 250, the input impedance may vary based on a location of a target even if the internal area of the feeder 260 has been adjusted to adjust the input impedance to match an output impedance of a power amplifier for a specific location of the target. Accordingly, a separate matching network may be needed to match the input impedance to the output impedance of the power amplifier. For example, when the input impedance increases, a separate matching network may be needed to match the increased input impedance to a relatively low output impedance of the power amplifier.

In an example in which a target resonator has the same configuration as the source resonator 250, and a feeder of the target resonator has the same configuration as the feeder 260, a separate matching network may be needed because a direction of a current flowing in the target resonator is opposite to a direction of an induced current flowing in the feeder of the target resonator.

Figure 3A:
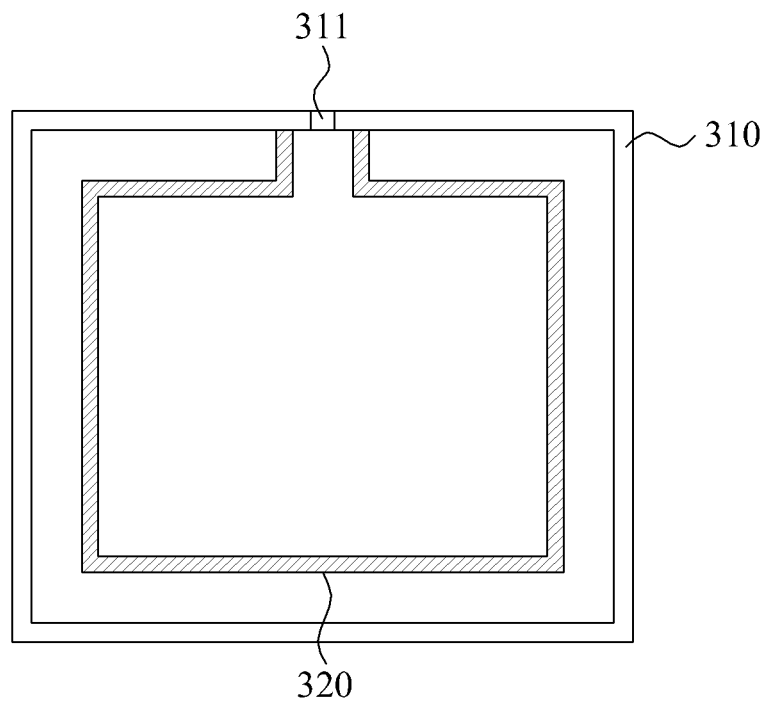
FIGS. 3A and 3B illustrate an example of a wireless power transmission apparatus.
Figure 3B:
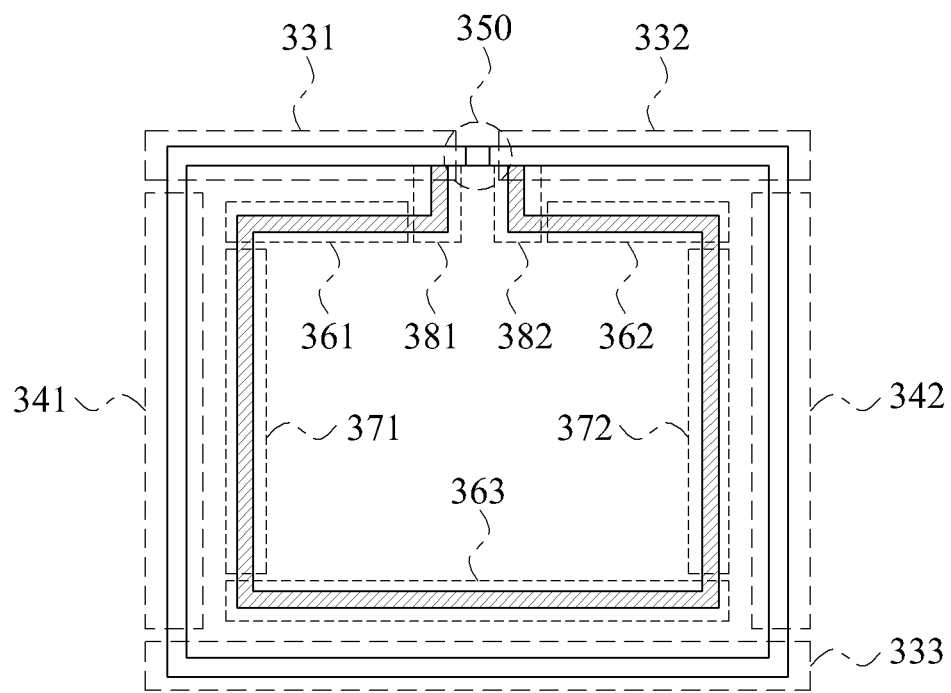

FIGS. 3A and 3B illustrate an example of a wireless power transmission apparatus.

Referring to FIG. 3A, the wireless power transmission apparatus includes a resonator 310 and a feeder 320. The resonator 310 may includes a capacitor 311. The feeder 320 is electrically connected to both ends of the capacitor 311.

FIG. 3B illustrates a structure of the wireless power transmission apparatus of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be concentrated in the capacitor 350. In general, a transmission line includes at least one conductor disposed in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and conductor disposed in the lower portion of the first transmission line will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 disposed in the upper portion of the first transmission line, and the first ground conducting portion 333 disposed in the lower portion of the first transmission line. The first signal conducting portion 331 and the second signal conducting portion 332 are disposed to face the first ground conducting portion 333. A current flows through the first signal conducting portion 331 and the second signal conducting portion 332.

Additionally, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, and the first conductor 341, and the second conductor 342 are connected to each other, causing the resonator 310 to have an electrically closed loop structure. The term "loop structure" includes a polygonal structure, a circular structure, a rectangular structure, or any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electrical characteristic that is not found in nature, and thus may have an artificially designed structure. All materials existing in nature have a magnetic permeability and a permittivity. Most materials have a positive magnetic permeability and a positive permittivity.

In the case of most materials, a right-hand rule may be applied to an electric field, a magnetic field, and a Poynting vector, so the corresponding materials may be referred to as right-handed materials (RHMs). However, a metamaterial having a magnetic permeability and/or a permittivity not found in nature may be classified into an epsilon negative (ENG) material, a mu negative (MNG) material, a double negative (DNG) material, a negative refractive index (NRI) material, a left-handed (LH) material, or any other metamaterial classification known to one of ordinary skill in the art based on a sign of the permittivity of the metamaterial and a sign of the magnetic permeability of the metamaterial.

If the capacitor 350 is a lumped element capacitor and the capacitance of the capacitor 350 is appropriately determined, the resonator 310 may have a characteristic of a metamaterial. If the resonator 310 is caused have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is 0. When the MNG resonator 310 has the zeroth-order resonance characteristic, the resonant frequency is independent of a physical size of the MNG resonator 310. The resonant frequency of the MNG resonator 310 having the zeroth-order resonance characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 disposed in an upper portion of the second transmission line, and a second ground conducting portion 363 disposed in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of the total magnetic field in the resonator 310 to increase inside the feeder 320, but decrease outside the feeder 320.

An input impedance is determined by an area of a region between the resonator 310 and the feeder 320. Accordingly, a separate matching network used to match the input impedance to an output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. In another example, if the resonator 310 has a circular structure, the feeder 320 may also have a circular structure.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names of the various elements in FIGS. 3A and 3B will be used without reference numerals in the following description of FIG. 4A for ease of description.

A feeding operation may be an operation of supplying power to a source resonator in wireless power transmission, or an operation of supplying AC power to a rectifier in the wireless power transmission. FIG. 4A illustrates a direction of an input current flowing in the feeder, and a direction of an induced current induced in the resonator. Additionally, FIG. 4A illustrates a direction of a magnetic field generated by the input current of the feeder, and a direction of a magnetic field generated by the induced current of the resonator.

Referring to FIG. 4A, the fifth conductor or the sixth conductor of the feeder may be used as an input port 410. In the example in FIG. 4A, the sixth conductor 382 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder. The input current flows in a clockwise direction in the feeder along the second transmission line of the feeder. The fifth conductor and the sixth conductor of the feeder are electrically connected to the resonator. More particularly, the fifth conductor of the feeder is connected to the first signal conducting portion of the resonator, and the sixth conductor of the feeder is connected to the second signal conducting portion of the resonator. Accordingly, the input current flows in both the resonator and the feeder. The input current flows in a counterclockwise direction in the resonator. The input current flowing in the resonator generates a magnetic field, and the magnetic field induces a current in the resonator. The induced current flows in a clockwise direction in the resonator. The induced current in the resonator supplies energy to the capacitor of the resonator, and also generates a magnetic field. In this example, the input current flowing in the feeder and the resonator is indicated by the solid lines with arrowheads in FIG. 4A, and the induced current flowing in the resonator is indicated by the dashed lines with arrowheads in FIG. 4A.

A direction of a magnetic field generated by a current is determined based on the right-hand rule. As illustrated in FIG. 4A, inside the feeder, a direction 421 of the magnetic field generated by the input current flowing in the feeder is the same as a direction 423 of the magnetic field generated by the induced current flowing in the resonator. Accordingly, the strength of the total magnetic field increases inside the feeder.

In contrast, in a region between the feeder and the resonator, a direction 433 of the magnetic field generated by the input current flowing in the feeder is opposite to a direction 431 of a magnetic field generated by the induced current flowing in the resonator. Accordingly, the strength of the total magnetic field decreases in the region between the feeder and the resonator.

Typically, in a resonator having a loop structure, a strength of a magnetic field decreases in the center of the resonator, and increases near an outer periphery of the resonator. However, referring to FIG. 4A, since the feeder is electrically connected to both ends of the capacitor of the resonator, the direction of the induced current in the resonator is the same as the direction of the input current in the feeder. Since the induced current in the resonator flows in the same direction as the input current in the feeder, the strength of the total magnetic field increases inside the feeder, and decreases outside the feeder. As a result, due to the feeder, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A wireless power transmission efficiency of transmitting power from a source resonator to a target resonator is proportional to the strength of the total magnetic field generated in the source resonator. In other words, when the strength of the total magnetic field increases in the center of the source resonator, the wireless power transmission efficiency also increases.

Figure 4B:
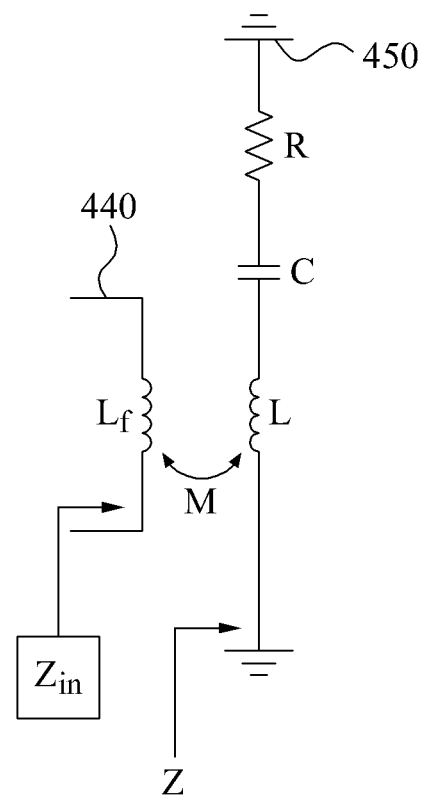
FIG. 4B illustrates examples of equivalent circuits of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 4.

$$Z_{in} = \frac{(\omega M)^2}{Z} \quad (4)$$

In Equation 4, M denotes a mutual inductance between the feeder 440 and the resonator 450, ω denotes a resonant frequency between the feeder 440 and the resonator 450, and Z denotes an impedance viewed in a direction from the resonator 450 to a target.

As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In a target resonator and a feeder included in a wireless power reception apparatus, a magnetic field may be distributed as illustrated in FIG. 4A. For example, the target resonator may receive wireless power from a source resonator via a magnetic coupling with the source resonator. The received wireless power induces a current in the target resonator. The induced current in the target resonator generates a magnetic field, which induces a current in the feeder. If the target resonator is connected to the feeder as illustrated in FIG. 4A, the induced current in the target resonator will flow in the same direction as the induced current in the feeder. Accordingly, for the reasons discussed above, the strength of the total magnetic field will increase inside the feeder, but will decrease in a region between the feeder and the target resonator.

Figure 5:
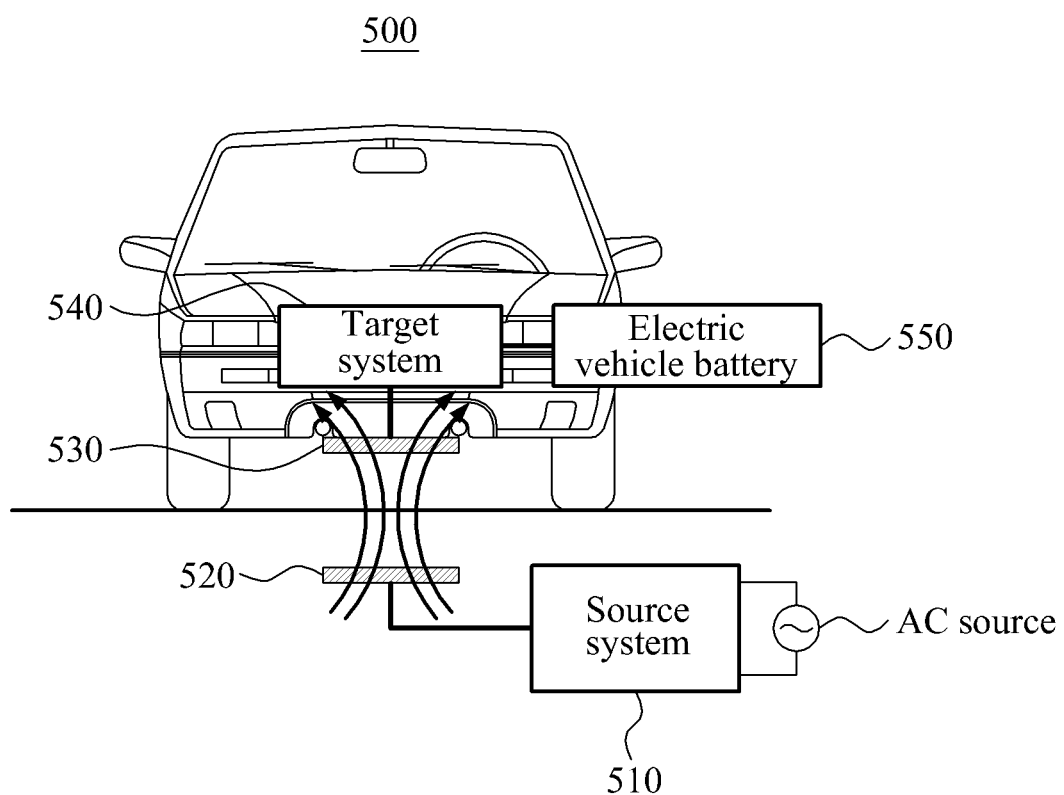
FIG. 5 illustrates an example of an electric vehicle charging system.

FIG. 5 illustrates an example of an electric vehicle charging system.

Referring to FIG. 5, an electric vehicle charging system 500 includes a source system 510, a source resonator 520, a target resonator 530, a target system 540, and an electric vehicle battery 550.

The electric vehicle charging system 500 may have a structure similar to the structure of the wireless power transmission system of FIG. 1. The source system 510 and the source resonator 520 in the electric vehicle charging system 500 operate as a source. Additionally, the target resonator 530 and the target system 540 in the electric vehicle charging system 500 operate as a target.

In one example, the source system 510 includes a variable SMPS, a power amplifier (PA), a matching network, a TX controller, a communication unit, and a power detector similar to those of the source 110 of FIG. 1. In one example, the target system 540 includes a matching network, a rectifier, a DC/DC converter, a communication unit, an RX controller, a voltage detector, and a power detector similar to those of the target 120 of FIG. 1.

The electric vehicle battery 550 is charged by the target system 540.

The electric vehicle charging system 500 may use a resonant frequency in a band of a few kilohertz (kHz) to tens of MHz.

The source system 510 generates power based on a type of the electric vehicle being charged, a capacity of the electric vehicle battery 550, and a charging state of the electric vehicle battery 550, and wirelessly transmits the generated power to the target system 540 via a magnetic coupling between the source resonator 520 and the target resonator 530.

The source system 510 may control an alignment of the source resonator 520 and the target resonator 530. For example, when the source resonator 520 and the target resonator 530 are not aligned with each other, the TX controller of the source system 510 may transmit a message to the target system 540 to control the alignment of the source resonator 520 and the target resonator 530.

For example, when the target resonator 530 is not located in a position enabling maximum magnetic coupling, the source resonator 520 and the target resonator 530 are not e properly aligned with each other. When an electric vehicle does not stop at a proper position to accurately align the source resonator 520 and the target resonator 530 with each other, the source system 510 may instruct a position of the electric vehicle to be adjusted to control the source resonator 520 and the target resonator 530 to be aligned with each other. However, this is merely an example, and other methods of aligning the source resonator 520 and the target resonator 530 with each other may be used.

The source system 510 and the target system 540 may transmit and receive an ID of an electric vehicle and exchange various messages by communicating with each other.

The descriptions of FIGS. 1 through 4B are also applicable to the electric vehicle charging system 500. However, the electric vehicle charging system 500 may use a resonant frequency in a band of a few kHz to tens of MHz, and may transmit power that is equal to or higher than tens of watts to charge the electric vehicle battery 550.

FIGS. 6A, 6B, 7A, and 7B illustrate examples of applications using a wireless power reception apparatus and a wireless power transmission apparatus.

Figure 6A:
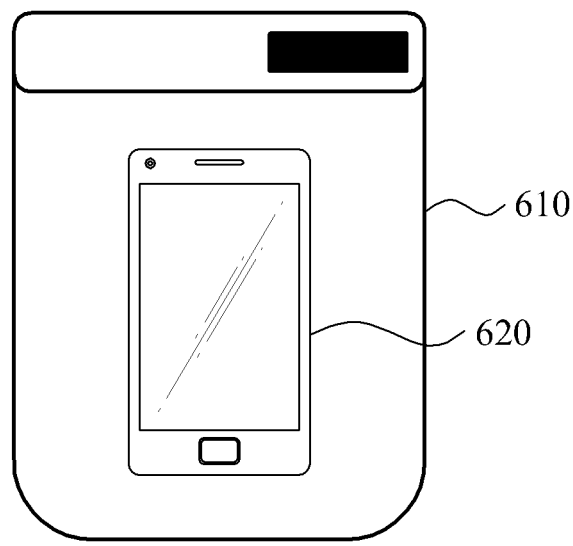
FIGS. 6A, 6B, 7A, and 7B illustrate examples of applications using a wireless power reception apparatus and a wireless power transmission apparatus.
Figure 6B:
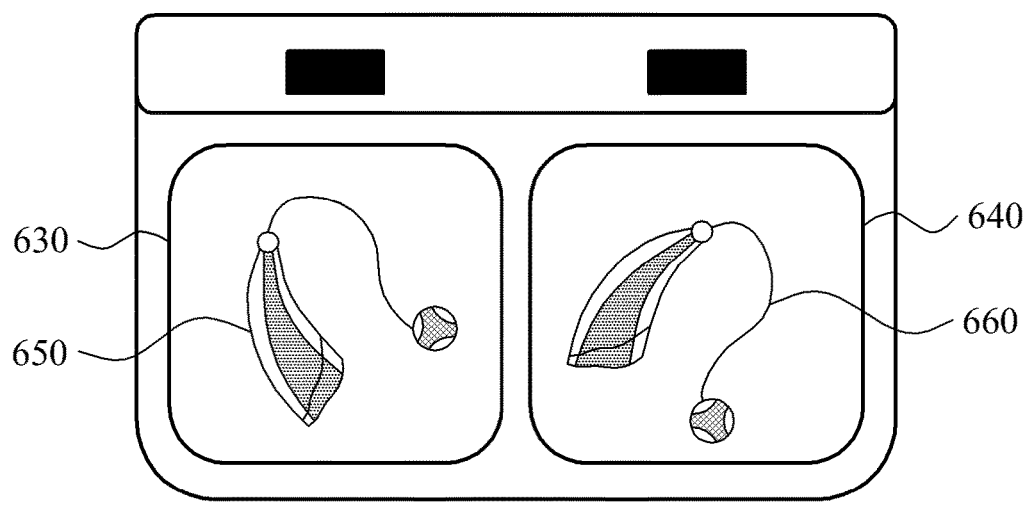

FIG. 6A illustrates an example of wireless power charging between a pad 610 and a mobile terminal 620, and FIG. 6B illustrates an example of wireless power charging between pads 630 and 640 and hearing aids 650 and 660.

In the example in FIG. 6A, a wireless power transmission apparatus is mounted in the pad 610, and a wireless power reception apparatus is mounted in the mobile terminal 620. The pad 610 is used to charge a single mobile terminal, namely, the mobile terminal 620.

In the example in FIG. 6B, two wireless power transmission apparatuses are respectively mounted in the pads 630 and 640. The hearing aids 650 and 660 may be used for a left ear and a right ear, respectively. In this example, two wireless power reception apparatuses are respectively mounted in the hearing aids 650 and 660.

Figure 7A:
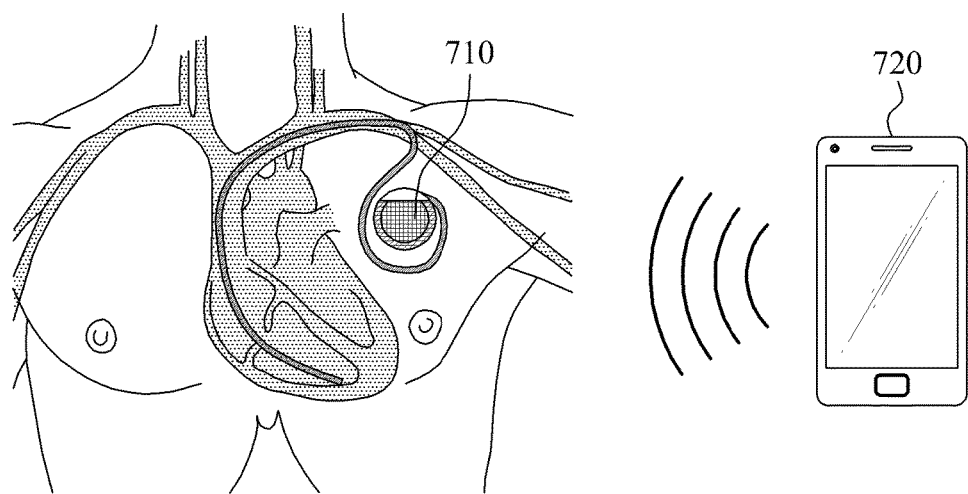
Figure 7B:
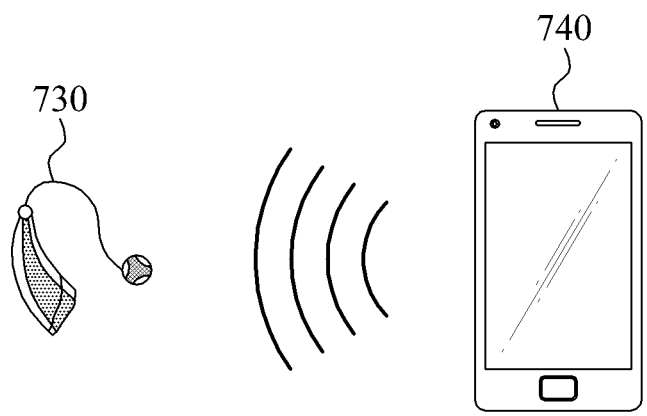

FIG. 7A illustrates an example of wireless power charging between an electronic device 710 that is implanted into a human body and a mobile terminal 720. FIG. 7B illustrates an example of wireless power charging between a hearing aid 730 and a mobile terminal 740.

In the example in FIG. 7A, a wireless power transmission apparatus and a wireless power reception apparatus are mounted in the mobile terminal 720, and a wireless power reception apparatus is mounted in the electronic device 710 implanted in the human body. The electronic device 710 is charged by receiving power from the mobile terminal 720.

In the example in FIG. 7B, a wireless power transmission apparatus and a wireless power reception apparatus are mounted in the mobile terminal 740, and a wireless power reception apparatus is mounted in the hearing aid 730. The hearing aid 730 is charged by receiving power from the mobile terminal 740. Low-power electronic devices, such as Bluetooth earphones, may also be charged by receiving power from the mobile terminal 740.

Figure 8:
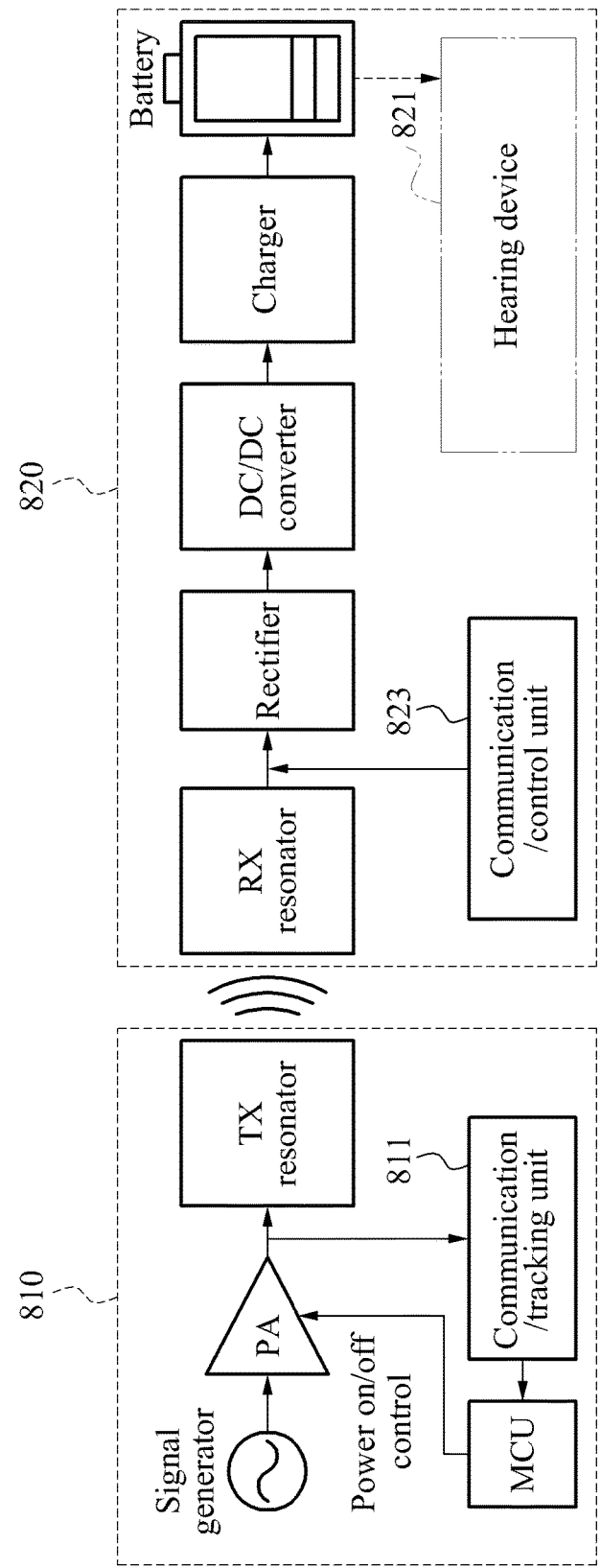
FIG. 8 illustrates an example of a wireless power transmission and reception system.

FIG. 8 illustrates an example of a wireless power transmission and reception system.

A wireless power transmission apparatus 810 of FIG. 8 may be mounted in the pad 610 of FIG. 6A, the pads 630 and 640 of FIG. 6B, the mobile terminal 720 of FIG. 7A, and the mobile terminal 740 of FIG. 7B.

A wireless power reception apparatus 820 of FIG. 8 may be mounted in the mobile terminal 620 of FIG. 6A, the hearing aids 650 and 660 of FIG. 6B, the hearing aids 650 and 660 of FIG. 6B, the electronic device 710 and the mobile terminal 720 of FIG. 7A, and the hearing aid 730 and the mobile terminal 740 of FIG. 7B.

The wireless power transmission apparatus 810 has a configuration similar to the configuration of the source 110 of FIG. 1. For example, the wireless power transmission apparatus 810 may include a unit configured to transmit power via a magnetic coupling.

As illustrated in FIG. 8, the wireless power transmitter 810 includes a signal generator, a power amplifier (PA), a communication/tracking unit 811, a micro control unit (MCU), and a source (TX) resonator. The signal generator generates a signal having a resonant frequency of the TX resonator. The communication/tracking unit 811 communicates with the wireless power reception apparatus 820, and controls an input impedance and a resonant frequency to maintain a wireless power transmission efficiency. The communication/tracking unit 811 and the MCU may perform functions similar to the functions performed by the TX controller 114 and the communication unit 115 of FIG. 1.

The wireless power reception apparatus 820 has a configuration similar to the configuration of the target 120 of FIG. 1. For example, the wireless power reception apparatus 820 may include a unit configured to wirelessly receive power and charge a battery with the received power.

As illustrated in FIG. 8, the wireless power reception apparatus 820 includes a target (RX) resonator, a rectifier, a DC/DC converter, a charger, a battery, and a communication/control unit 823.

The communication/control unit 823 communicates with the wireless power transmission apparatus 810, and performs an operation to protect a device powered by the wireless power reception apparatus 820 from overvoltage and overcurrent.

The wireless power reception apparatus 820 may include a hearing device 821. The hearing device 821 may be powered by the battery. The hearing device 821 may include a microphone, an analog-to-digital converter (ADC), a processor, a digital-to-analog converter (DAC), and a receiver. For example, the hearing device 821 may have the same configuration as a hearing aid.

Figure 9:
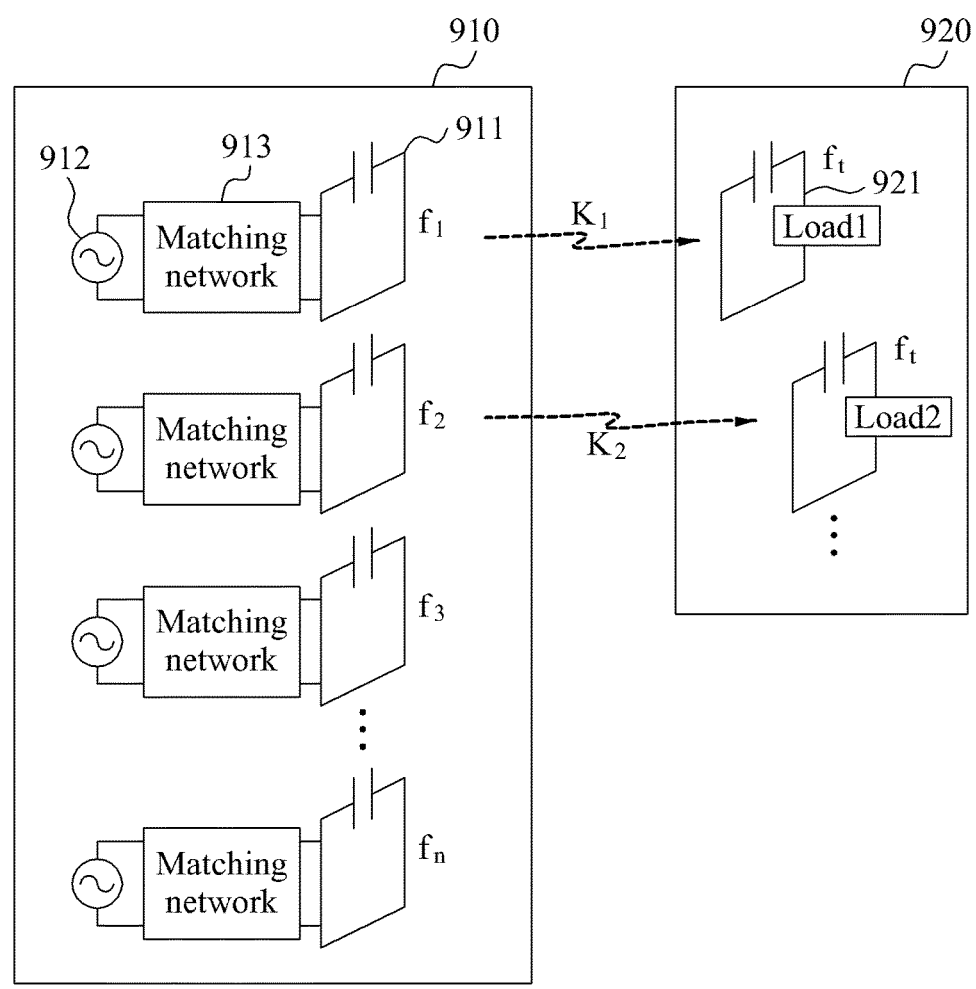
FIG. 9 illustrates another example of a wireless power transmission and reception system.

FIG. 9 illustrates another example of a wireless power transmission and reception system.

The wireless power transmission and reception system of FIG. 9 includes a wireless power transmission apparatus 910 and a wireless power reception apparatus 920. The wireless power transmission apparatus 910 includes a plurality of TX resonators, for example, a TX resonator 911, a plurality of feeders, for example, a feeder 912, and a plurality of matching networks, for example, a matching network 913. The wireless power reception apparatus 920 includes at least one RX resonator, for example, an RX resonator 921. Resonant frequencies of the plurality of TX resonators may be $f_1, f_2, f_3, \ldots f_n$, and a resonant frequency of the at least one RX resonator may be $f_r$. Various ones of the plurality of TX resonators and various ones of the at least one RX resonator may be coupled to each other by coupling coefficients $k_1$ and $k_2$. However, these are merely examples, and the resonant frequencies and the coupling coefficients are not limited to these examples.

In the following description, a source and a target correspond to the wireless power transmission apparatus 910 and the wireless power reception apparatus 920, respectively. A source resonator and a target resonator correspond to the TX resonator 911 and the RX resonator 921, respectively.

By using wireless power transmission, power may be simultaneously supplied to a plurality of devices, or various types of devices, from a single wireless power transmission apparatus. For example, devices may require different power levels based on a type and circumstances of the devices. The wireless power transmission and reception system of FIG. 9 may stably wirelessly transmit power to a plurality of devices, or various types of devices, at the same time. The wireless power reception apparatus 920 may stably receive power required by a device, and may be applied to an apparatus with a built-in battery, for example, a mobile electronic device, and to an apparatus that is installed in a home, an office, a factory, or other location and requires a wireless power supply without a battery.

In one example, to charge a plurality of devices, a plurality of devices to be charged are placed on the wireless power transmission apparatus 910 that is provided in a shape of a pad, for example, a plane, or a 2D shape. In this example, to stably supply power required by a device, a coupling coefficient between the TX resonator 911 and RX resonator 921 needs to be maintained constant, despite the device being located at a predetermined portion of the wireless power transmission apparatus 910. When a size of the TX resonator 911 is different from a size of the RX resonator 921, the coupling coefficient may be reduced compared to an example in which the size of the TX resonator 911 is the same as the size of the RX resonator 921. When the coupling coefficient is reduced, a wireless power transmission efficiency is reduced. Additionally, as a number of wireless power reception apparatuses that need to be charged increases, a size of the wireless power transmission apparatus 910 may increase. In other words, the size of the TX resonator 911 may be greatly different from the size of the RX resonator 921, and accordingly a wireless power transmission efficiency may be reduced. Thus, the wireless power transmission efficiency may be maximized by preventing a reduction in the coupling coefficient caused by the size of the wireless power transmission apparatus 910.

In another example, a wireless power transmission apparatus having a three-dimensional (3D) shape may wirelessly transmit power to a wireless power reception apparatus located near the wireless power transmission apparatus. In this example, unlike the pad-type wireless power transmission apparatus 910, a coupling coefficient between the wireless power transmission apparatus and the wireless power reception apparatus may be significantly changed based on a location of the wireless power reception apparatus, an arrangement and a distance between the wireless power transmission apparatus and the wireless power reception apparatus, and other factors. Additionally, when coupling coefficients between TX resonators and RX resonators are different from each other, it may be difficult for the wireless power transmission apparatus 910 to transmit the power required by each wireless power reception apparatus 920. For example, the wireless power transmission apparatus 910 may change an effective coupling coefficient by controlling current flowing in a resonator forming the wireless power transmission apparatus 910 through the matching network 913, despite different coupling coefficients for each wireless power reception apparatus 920. Accordingly, power needed by the wireless power reception apparatus 920 may be stably supplied by the wireless power transmission apparatus 910.

The wireless power transmission apparatus 910 may have a 3D shape, or the shape of a pad as illustrated in FIG. 9. The wireless power transmission apparatus 910 may include the plurality of TX resonators and a plurality of power amplifiers (PAs) that are configured to supply power to each of the plurality of TX resonators.

Figure 10:
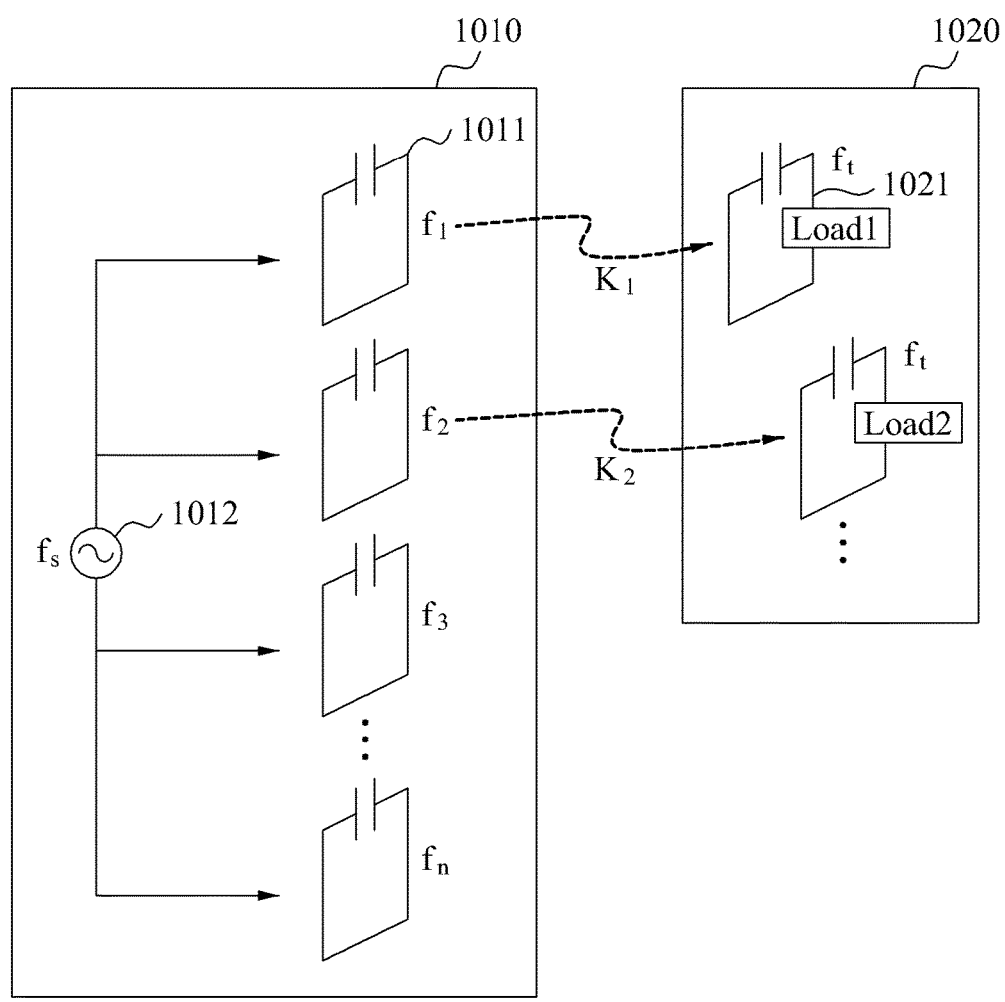
FIG. 10 illustrates another example of a wireless power transmission and reception system.

For example, a single feeder, for example, the feeder 1012 illustrated in FIG. 10, may supply power to a plurality of TX resonators as illustrated in FIG. 10. Accordingly, a number of PAs required by the wireless power transmission apparatus 910 may be reduced, enabling a cost of the wireless power transmission apparatus 910 to be reduced, and enabling isolation between the TX resonators to be easily obtained. Thus, the wireless power transmission efficiency may be increased.

FIG. 10 illustrates another example of a wireless power transmission and reception system.

The wireless power transmission and reception system of FIG. 10 includes a wireless power transmission apparatus 1010 and a wireless power reception apparatus 1020. The wireless power transmission apparatus 1010 includes a feeder 1012 and a multi-resonator including a plurality of TX resonators, for example, a TX resonator 1011. The wireless power reception apparatus 1020 includes at least one RX resonator, for example, an RX resonator 1021.

The feeder 1012 supplies power to the TX resonator 1011. The feeder 1012 supplies power to the TX resonator 1011 at a tracked input frequency $f_s$. The feeder 1012 supplies power to each of the plurality of TX resonators in the multi-resonator. For example, the feeder 1012 may supply power to each of the plurality of TX resonators so that the same input frequency of the power may be used.

In one example, the multi-resonator includes n TX resonators to transmit power to the wireless power reception apparatus 1020. In this example, n is an integer equal to or greater than 2. As illustrated in FIG. 10, resonant frequencies of the TX resonators may be $f_1, f_2, f_3, \ldots f_n$. In another example, the multi-resonator may include at least two TX resonators designed to have resonant frequencies matched to a resonant frequency of the RX resonator 1021.

Figure 14:
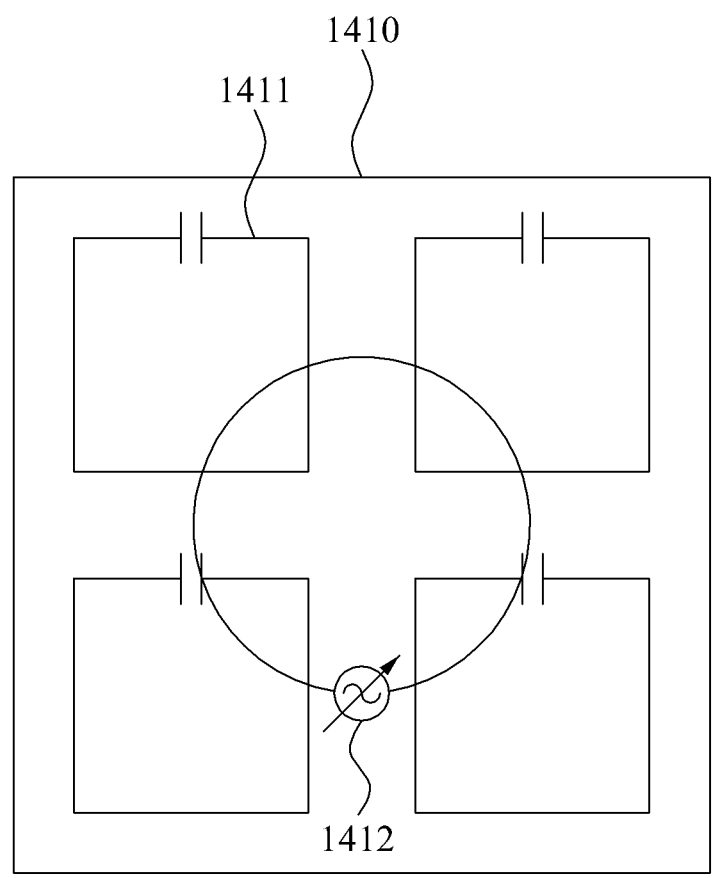
FIGS. 14 and 15 illustrate examples in which a multi-resonator and a feeder are connected using an inductive coupling scheme.

For example, at least two TX resonators may be designed so that a difference between a resonant frequency of each of the at least two TX resonators and the resonant frequency of the RX resonator 1021 is within 20% of the frequency of the resonant frequency of the RX resonator 1021. The resonant frequencies of some or all of the at least two TX resonators may be equal to one another, or may different from one another. In another example, when mutual resonance occurs between the TX resonator 1011 and the RX resonator 1021, the TX resonator 1011 may be designed so that the resonant frequency of the TX resonator 1011 is matched to the resonant frequency of the RX resonator 1021. In this example, the resonant frequency of the TX resonator 1011 may be designed, as illustrated in FIG. 14 below, based on an example in which the wireless power reception apparatus 1020 is disposed near the wireless power transmission apparatus 1010.

The wireless power reception apparatus 1020 includes the at least one RX resonator, for example, the RX resonator 1021. For example, a resonant frequency of each of the at least one RX resonator may be designed to be $f_r$, but is not limited thereto. Accordingly, at least one resonant frequency of the at least one RX resonator may be different from at least one other resonant frequency of the at least one resonant RX resonator. The TX resonator 1011 and the RX resonator 1021 may be coupled to each other through resonance, and accordingly power may be transmitted from the TX resonator 1011 to the RX resonator 1021. For example, the TX resonator 1011 and the RX resonator 1021 may be coupled to each other by a coupling coefficient $k_1$, and power may be transmitted from the TX resonator 1011 to the RX resonator 1021.

In one example, a load resistor in which power is consumed, for example, load 1 and load 2, represents an equivalent resistance that stably consumes power for each wireless power reception apparatus. In another example, although not illustrated in FIG. 10, the wireless power transmission and reception system may include a matching circuit configured to match the TX resonator 1011, the RX resonator 1021, the feeder 1012, and the load resistor. A frequency controller may include a matching circuit in the wireless power transmission apparatus 1010. The matching circuit may be, for example, a matching network. For example, the frequency controller may control a frequency of the feeder 1012, and may match the TX resonator 1011, the RX resonator 1021, the feeder 1012, and the load resistor using the matching network.

The matching circuit may be required to efficiently transmit power from the TX resonator 1011 to a load through the RX resonator 1021. In an example in which a distance between the TX resonator 1011 and the RX resonator 1021, and a location and a direction of each of the TX resonator 1011 and the RX resonator 1021, remain unchanged, that is, an example in which the coupling coefficient $k_1$ between the TX resonator 1011 and the RX resonator 1021 remains unchanged, the matching circuit may be simplified. In another example, through structures of wireless power transmission apparatuses 1110 through 1510 of FIGS. 11 through 15, and an operation of adjusting a frequency of an input signal that will be described below with reference to FIGS. 16 and 17, the number of matching circuits used to stably supply power to a plurality of wireless power reception apparatuses may be minimized, thereby reducing a cost of the wireless power transmission apparatus and a power loss in the matching circuits.

Figure 11:
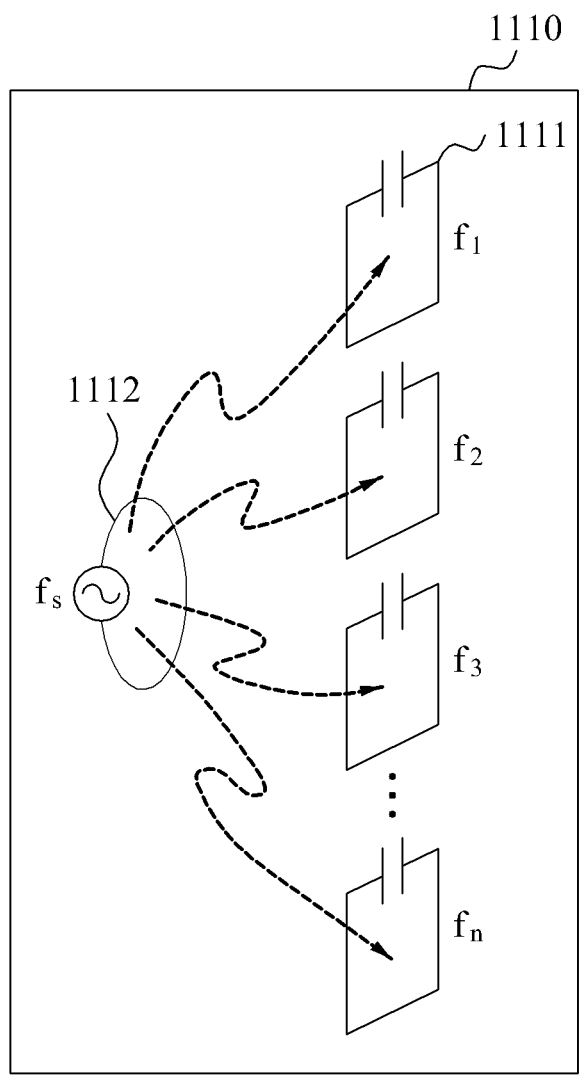
FIGS. 11 through 13 illustrate examples of a scheme of connection between a feeder and a multi-resonator.
Figure 12:
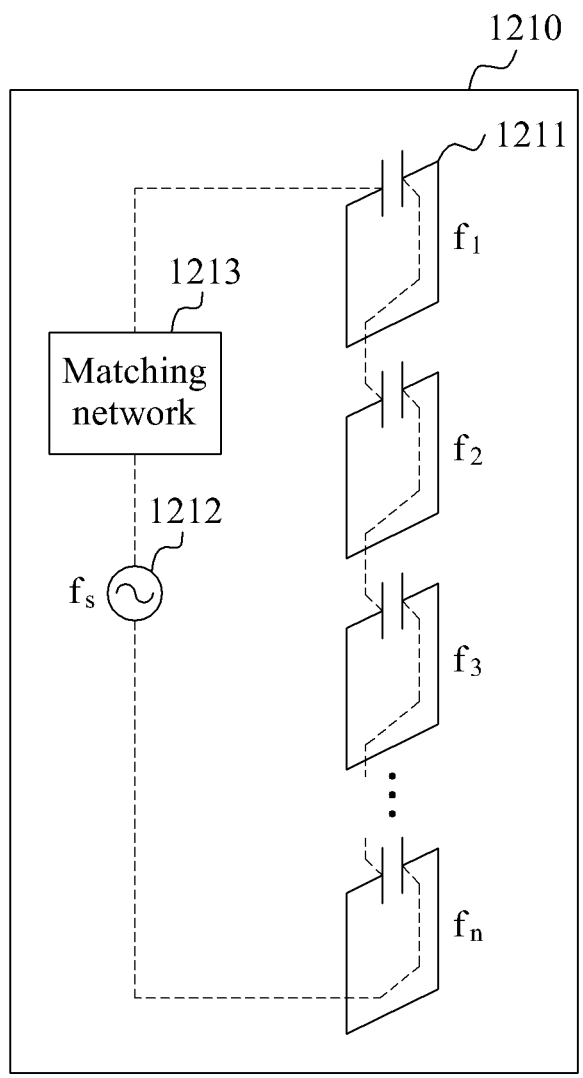
Figure 13:
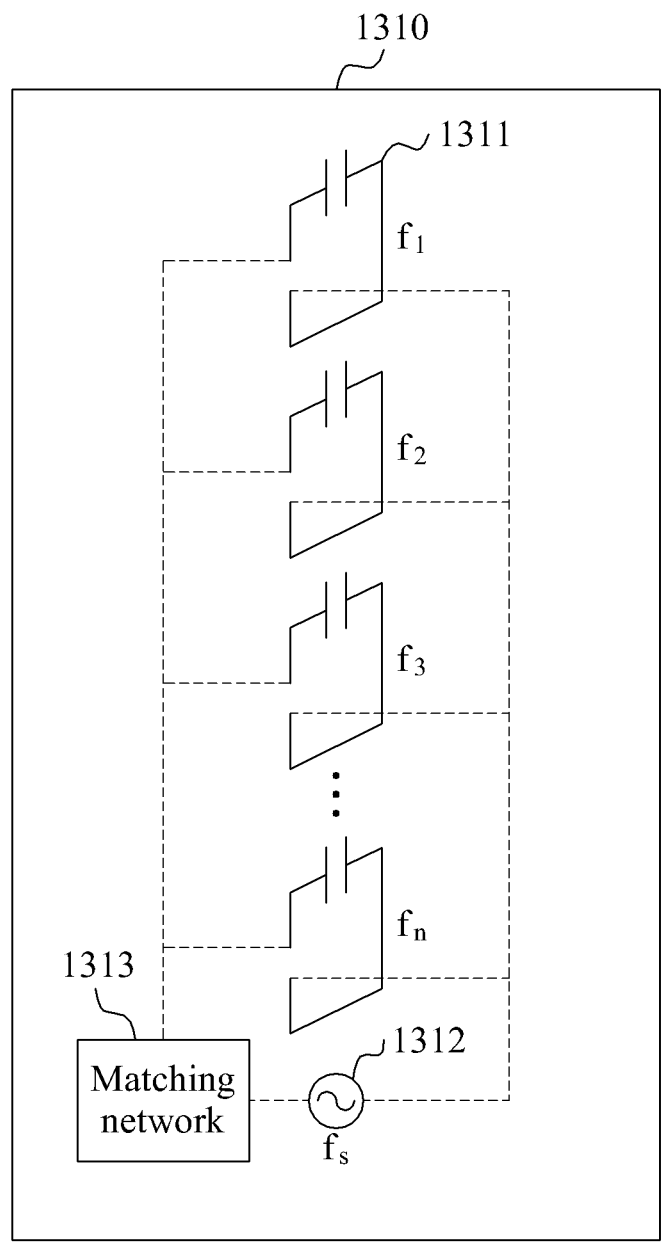

FIGS. 11 through 13 illustrate examples of a scheme of connection between a feeder and a multi-resonator.

Referring to FIG. 11, a wireless power transmission apparatus 1110 includes a feeder 1112 and a multi-resonator that includes a plurality of TX resonators, for example, a TX resonator 1111.

Referring to FIG. 12, a wireless power transmission apparatus 1210 includes a multi-resonator, a feeder 1212, and a matching network 1213. The multi-resonator includes a plurality of TX resonators, for example, a TX resonator 1211.

Referring to FIG. 13, a wireless power transmission apparatus 1310 includes a multi-resonator, a feeder 1312, and a matching network 1313. The multi-resonator includes a plurality of TX resonators, for example, a TX resonator 1311.

In FIG. 11, the feeder 1112 supplies power to the multi-resonator through inductive coupling. In FIG. 12, the plurality of TX resonators in the multi-resonator are connected in parallel with each other, and the feeder 1212 is connected in series with the multi-resonator and supplies power to the multi-resonator. In FIG. 13, the plurality of TX resonators in the multi-resonator are connected in series with each other, and the feeder 1312 is connected in parallel with the multi-resonator and supplies power to the multi-resonator.

In the schemes of the connection between the multi-resonators and the feeders 1112 through 1312 of FIGS. 11 through 13, a smaller number of switching devices may be required for a matching circuit when a coupling coefficient between a TX resonator and an RX resonator continues to be changed. Accordingly, a cost and a power loss in the matching circuit may be reduced. Thus, a wireless power transmission efficiency may be increased.

Figure 15:
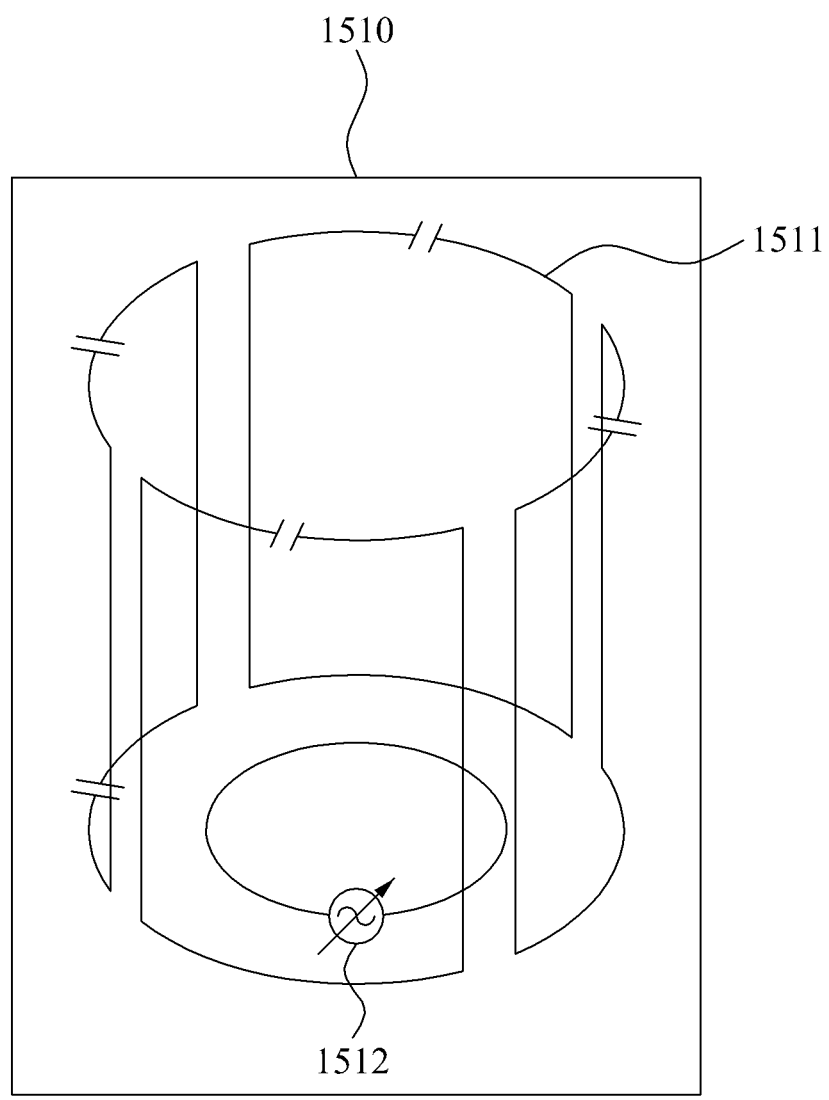

FIGS. 14 and 15 illustrate examples in which a multi-resonator and a feeder are connected using an inductive coupling scheme. In FIG. 14, a plurality of TX resonators included in a multi-resonator, for example, a TX resonator 1411, are arranged in a two-dimensional pattern. In FIG. 15, a plurality of TX resonators included in a multi-resonator, for example, a TX resonator 1511, are arranged in a three-dimensional pattern.

In FIGS. 14 and 15, each of the wireless power transmission apparatuses 1410 and 1510 includes four TX resonators. The TX resonator 1411 may be assumed to be induced and operated by a signal of a feeder 1412, and the TX resonator 1511 may be assumed to be induced and operated by a signal of a feeder 1512.

In one example, resonant frequencies of the TX resonators 1411 and 1511 may be designed to be equal to one another. Power may be stably supplied to a currently used TX resonator by adjusting a resonant frequency of a TX resonator that is not being used since a wireless power reception apparatus is not located on or near the TX resonator that is not being used, or by powering off the TX resonator that is not being used using a switch, a relay, or other switching device.

The TX resonator 1411 has a shape of a pad as illustrated in FIG. 14, and a switch and/or a relay may not be used. In an example in which a wireless power reception apparatus is located near the TX resonator 1411, a resonant frequency of the TX resonator 1411 may be shifted since the wireless power reception apparatus includes a conductor. In this example, the resonant frequency of the TX resonator 1411 may be shifted based on arrangement of an RX resonator, and accordingly the shifted resonant frequency of the TX resonator 1411 may be designed to be similar to a resonant frequency of the RX resonator. In another example in which a wireless power reception apparatus is located on the TX resonator 1411, the resonant frequency of the TX resonator 1411 may be matched to a resonant frequency of an RX resonator. In this example, when an input frequency is set to a corresponding resonant frequency, power may be efficiently supplied to the wireless power reception apparatus.

Additionally, in this example, when another wireless power reception apparatus is additionally located on the wireless power transmission apparatus 1410, a resonant frequency of a TX resonator corresponding to a location of the other wireless power reception apparatus may be set to be changed. Additionally, even when the resonant frequency of the TX resonator remains unchanged, a coupling coefficient may be changed. By tracking an input frequency as illustrated in FIG. 16, power required by the two wireless power reception apparatuses may be stably supplied.

Figure 16:
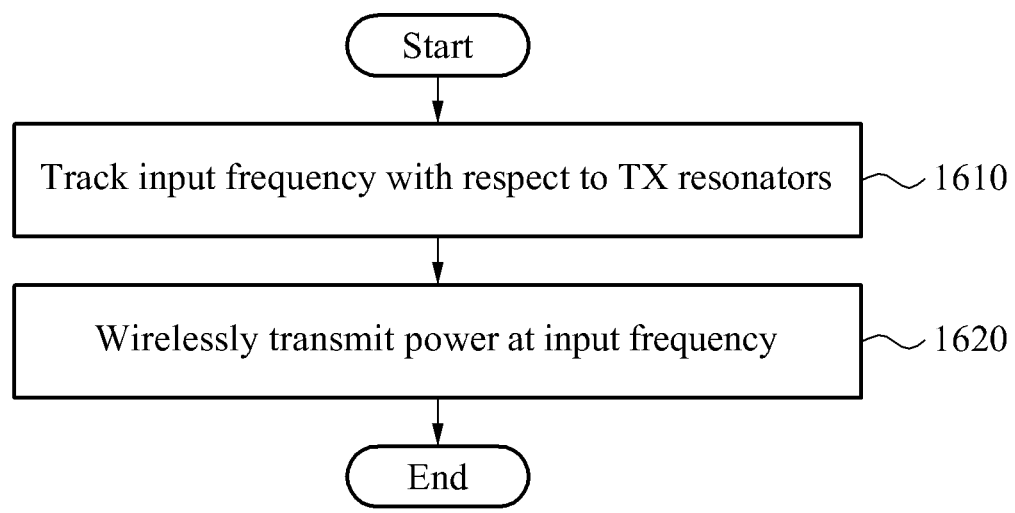
FIG. 16 illustrates an example of a wireless power transmission method.
Figure 17:
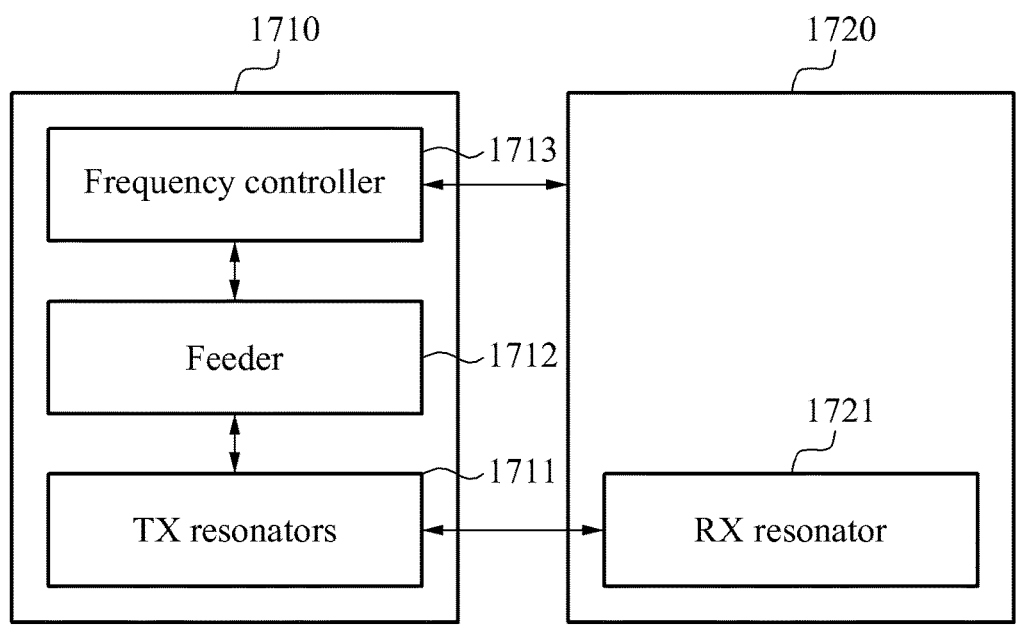
FIG. 17 illustrates another example of a wireless power transmission and reception system.

FIG. 16 illustrates an example of a wireless power transmission method. FIG. 17 illustrates another example of a wireless power transmission and reception system.

Referring to FIG. 17, a wireless power transmission apparatus 1710 includes a plurality of TX resonators 1711, a feeder 1712, and a frequency controller 1713. A wireless power reception apparatus 1720 includes at least one RX resonator, for example, an RX resonator 1721. The wireless power reception apparatus 1720 transmits wireless power transmission information to the wireless power transmission apparatus 1710. The wireless power transmission information may include, for example, information associated with power detected by the wireless power reception apparatus 1720. The wireless power transmission apparatus 1710 and the wireless power reception apparatus 1720 may transmit and receive the wireless power transmission information through a wireless communication, for example, Wi-Fi, Zigbee, Bluetooth, or any other type of wireless communication.

Referring to FIG. 16, in 1610, the frequency controller 1713 tracks an input frequency with respect to the plurality of TX resonators 1711. In one example, the frequency controller 1713 may perform a function similar to the functions performed by each of the communication/tracking unit 811 of FIG. 8, and the TX controller 114 and the communication unit 115 of FIG. 1, and may track the input frequency. The frequency controller 1713 tracks an input frequency that enables power to be stably supplied to the RX resonator 1721 among N frequencies in a predetermined range. For example, a frequency that enables wireless power transmission information to be equal to or greater than a predetermined threshold, a frequency that enables a wireless power transmission efficiency to be equal to or greater than a predetermined efficiency, and frequencies that enable other criteria to be met may be tracked among the N frequencies, and an input frequency may be controlled. In another example, an input frequency may be controlled to be one of the N frequencies, so that a wireless power transmission efficiency of each of at least one RX resonator may be equal to or greater than a predetermined efficiency.

The frequency controller 1713 controls the input frequency to be a tracked frequency. For example, the frequency controller 1713 may track a frequency of an input signal, namely an input frequency, that is equal to a resonant frequency of the RX resonator 1721 within a 20% error.

In one example, the frequency controller 1713 tracks an input frequency that enables wireless power transmission information received from the wireless power reception apparatus 1720 including the RX resonator 1721 to be equal to or greater than a predetermined threshold. In this example, the wireless power transmission information may include information associated with any one or any combination of a current, a voltage, and a power of the RX resonator 1721. The predetermined threshold may include, for example, a minimum value of each of a current, a voltage, and a power required by the wireless power reception apparatus 1720.

In another example, the frequency controller 1713 calculates a wireless power transmission efficiency based on wireless power transmission information received from the wireless power reception apparatus 1720 including the at least one RX resonator 1721, and tracks an input frequency based on the calculated wireless power transmission efficiency. In this example, the wireless power transmission efficiency may be a ratio of information associated with a power detected by the wireless power transmission apparatus 1710 to the wireless power transmission information received from the wireless power reception apparatus 1720. The wireless power transmission efficiency may include, for example, any one or any combination of a current ratio, a voltage ratio, and a power ratio of the RX resonator 1721 with respect to the plurality of TX resonators 1711. The frequency controller 1713 may control the input frequency so that the calculated wireless power transmission efficiency may be maintained to be equal to or greater than a predetermined efficiency. The predetermined efficiency may be, for example, an efficiency that ensures that an amount of power required by the wireless power reception apparatus 1720 will be received by the wireless power reception apparatus 1720.

In another example, the frequency controller 1713 tracks an input frequency that enables an increase in a wireless power transmission efficiency of an RX resonator having a coupling coefficient that is lower than a predetermined coefficient among the at least one RX resonator.

In 1620, the plurality of TX resonators 1711 wirelessly transmit power to the RX resonator 1721 at the input frequency. For example, at least two TX resonators may resonate with at least one RX resonator at an input frequency, and may wirelessly transmit power to the at least one RX resonator.

As described above, according to various examples, it is possible to match a resonant frequency of a TX resonator to a resonant frequency of an RX resonator through frequency tracking. In addition, it is possible to stably supply power to a plurality of wireless power reception apparatuses.

Additionally, according to various examples, it is possible to stably distribute power to a plurality of wireless power reception apparatuses. In addition, it is possible to efficiently transmit power using only a small number of matching circuits. Since a small number of switching devices and a small number of active devices are required, a cost of a wireless power transmission apparatus may be reduced, and a wireless power transmission efficiency may be increased.

The TX controller 114, the communication units 115 and 124, and the RX controller 125 in FIG. 1, the MCU, the communication/tracking units 811 and 823 in FIG. 8, and the frequency controller 1713 in FIG. 17 that perform the various operations described with respect to FIGS. 2A, 2B, 3A, 3B, 4A, 4B, 5, 6A, 6B, 7A, 7B, and 9-16 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A wireless power transmission apparatus comprising:
a plurality of transmission (TX) resonators connected in parallel with each other or in series with each other, each of the TX resonators resonating with a corresponding reception (RX) resonator at a resonant fre- quency, and wirelessly transmitting power to the corresponding RX resonator; and
a frequency controller configured to control an input frequency at which a feeder supplies power to each of the TX resonators,
wherein the TX resonators comprise TX resonators operating at different resonant frequencies, and
wherein the frequency controller tracks the input frequency that enables the power to be stably supplied to the corresponding RX resonator and the power is supplied to the corresponding RX resonator based on the tracked input frequency.

2. The wireless power transmission apparatus of claim 1, wherein the frequency controller is further configured to control the input frequency so that wireless power transmission information received from a wireless power reception apparatus comprising at least one RX resonator is equal to or greater than a threshold.

3. The wireless power transmission apparatus of claim 2, wherein the wireless power transmission information comprises information associated with any one or any combination of a current, a voltage, and a power of the at least one RX resonator.

4. The wireless power transmission apparatus of claim 1, wherein the frequency controller is further configured to control the input frequency so that a wireless power transmission efficiency, calculated based on wireless power transmission information received from a wireless power reception apparatus comprising the at least one RX resonator, is equal to or greater than a predetermined efficiency.

5. The wireless power transmission apparatus of claim 4, wherein the wireless power transmission efficiency comprises any one or any combination of a current ratio, a voltage ratio, and a power ratio of the at least one RX resonator with respect to the plurality of TX resonators.

6. The wireless power transmission apparatus of claim 1, wherein the frequency controller is further configured to control the input frequency to increase a wireless power transmission efficiency of an RX resonator, among at least one RX resonator, having a coupling coefficient lower than a predetermined coefficient.

7. The wireless power transmission apparatus of claim 1, wherein the frequency controller is further configured to control the input frequency so that a wireless power transmission efficiency of each of at least one RX resonator is equal to or greater than a predetermined efficiency.

8. A wireless power transmission apparatus comprising:
a multi-resonator comprising a plurality of transmission (TX) resonators, the plurality of TX resonators being designed to have resonant frequencies matched to a resonant frequency of a reception (RX) resonator; and
a feeder configured to supply power to each of the plurality of TX resonators of the multi-resonator at an input frequency,
wherein the plurality of TX resonators are connected in parallel with each other or in series with each other,
wherein the TX resonators comprise TX resonators operating at different resonant frequencies,
wherein the input frequency of each of the TX resonators is tracked to stably supply power to a corresponding RX resonator, and
wherein each of the TX resonators resonates with the corresponding RX resonator at the tracked input frequency, and wirelessly transmits power to the corresponding RX resonator at the tracked input frequency.

9. The wireless power transmission apparatus of claim 8, wherein the feeder is further configured to supply power having a same input frequency to each of the plurality of TX resonators; and
the plurality of TX resonators are designed so that the resonant frequencies are matched to the resonant frequency of the RX resonator during mutual resonance between the plurality of TX resonators and the RX resonator.

10. The wireless power transmission apparatus of claim 8, wherein the feeder is further configured to supply the power to the multi-resonator through an inductive coupling between the feeder and each of the plurality of TX resonators.

11. The wireless power transmission apparatus of claim 8, wherein in response to the plurality of TX resonators being connected in parallel with each other, the feeder is connected in series with the multi-resonator.

12. The wireless power transmission apparatus of claim 8, wherein in response to the plurality of TX resonators being connected in series with each other, the feeder is connected in parallel with the multi-resonator.

13. The wireless power transmission apparatus of claim 8, wherein the plurality of TX resonators are arranged in a two-dimensional pattern.

14. A wireless power transmission method comprising:
tracking an input frequency at which power is stably supplied from each of transmission (TX) resonators to a corresponding reception (RX) resonator; and
wirelessly transmitting the power to the corresponding RX resonator at the tracked input frequency,
wherein the TX resonators are connected in parallel with each other or in series with each other and the TX resonators comprise TX resonators operating at different resonant frequencies.

15. The wireless power transmission method of claim 14, wherein the tracking comprises tracking an input frequency that enables wireless power transmission information received from a wireless power reception apparatus comprising at least one RX resonator to be equal to or greater than a threshold.

16. The wireless power transmission method of claim 14, wherein the tracking comprises tracking the input frequency based on information associated with any one or any combination of a current, a voltage, and a power of at least one RX resonator.

17. The wireless power transmission method of claim 14, wherein the tracking comprises:
calculating a wireless power transmission efficiency based on wireless power transmission information received from a wireless power reception apparatus comprising at least one RX resonator; and
tracking the input frequency based on the calculated wireless power transmission efficiency.

18. The wireless power transmission method of claim 17, wherein the tracking of the input frequency based on the calculated wireless power transmission efficiency comprises tracking the input frequency based on any one or any combination of a current ratio, a voltage ratio, and a power ratio of the at least one RX resonator with respect to the TX resonators.

19. The wireless power transmission method of claim 14, wherein the tracking comprises tracking an input frequency that enables an increase in a wireless power transmission efficiency of an RX resonator having a coupling coefficient that is lower than a coefficient among at least one RX resonator.

20. The wireless power transmission method of claim 14, wherein the tracking comprises tracking an input frequency that enables a wireless power transmission efficiency of each of at least one RX resonator to be equal to or greater than a predetermined efficiency.

21. A wireless power transmission apparatus comprising:
- a plurality of transmission (TX) resonators configured to resonate with at least one reception (RX) resonator, and wirelessly transmit power to the at least one RX resonator; and
- a single matching network configured to match the plurality of TX resonators to the at least one RX resonator to increase a wireless power transmission efficiency of wirelessly transmitting the power to the at least one RX resonator,
- wherein the plurality of TX resonators are connected in parallel with each other or in series with each other, and the TX resonators comprise TX resonators operating at different resonant frequencies,
- wherein an input frequency, at which power is stably supplied from each of TX resonators to a corresponding RX resonator, is tracked, and
- wherein each of the TX resonators resonates with the corresponding RX resonator at the tracked input frequency, and wirelessly transmits power to the corresponding RX resonator at the tracked input frequency.

22. The wireless power transmission apparatus of claim 21, further comprising a single feeder configured to supply power to each of the plurality of TX resonators.

23. The wireless power transmission apparatus of claim 22, further comprising a frequency controller configured to control the input frequency at which the single feeder supplies the power to each of the TX resonators.

\* \* \* \* \*